US011676362B2

(12) United States Patent
Namioka

(10) Patent No.: US 11,676,362 B2
(45) Date of Patent: Jun. 13, 2023

(54) TRAINING SYSTEM AND ANALYSIS SYSTEM

(71) Applicant: KABUSHIKI KAISHA TOSHIBA, Tokyo (JP)

(72) Inventor: Yasuo Namioka, Nerima (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 235 days.

(21) Appl. No.: 17/015,843

(22) Filed: Sep. 9, 2020

(65) Prior Publication Data
US 2021/0081716 A1   Mar. 18, 2021

(30) Foreign Application Priority Data
Sep. 13, 2019   (JP) .............................. JP2019-166910

(51) Int. Cl.
*G06F 17/00* (2019.01)
*G06V 10/44* (2022.01)
*G06F 18/214* (2023.01)
*G06F 18/213* (2023.01)
*G06V 10/764* (2022.01)
(Continued)

(52) U.S. Cl.
CPC ............ *G06V 10/44* (2022.01); *G06F 18/213* (2023.01); *G06F 18/2148* (2023.01); *G06V 10/454* (2022.01); *G06V 10/764* (2022.01); *G06V 10/7747* (2022.01); *G06V 10/7788* (2022.01); *G06V 10/82* (2022.01); *G06V 40/10* (2022.01); *G06V 40/20* (2022.01)

(58) Field of Classification Search
CPC ........................... G06K 9/6257; G06K 9/6232
USPC ......................................................... 382/157
See application file for complete search history.

(56) References Cited

U.S. PATENT DOCUMENTS

2017/0132780 A1   5/2017   Namioka et al.
2019/0066327 A1*  2/2019   Fujimoto .................. G06T 7/60
(Continued)

FOREIGN PATENT DOCUMENTS

JP   2013-101527 A1   5/2013
JP   2017-91249 A     5/2017
(Continued)

OTHER PUBLICATIONS

Marinho et al., "Preliminary Evaluation of a Framework for Overhead Skeleton Tracking in Factory Environments using Kinect," ACM Press, 2017, 6 pages.
(Continued)

*Primary Examiner* — Michael R Neff
(74) *Attorney, Agent, or Firm* — Oblon, McClelland, Maier & Neustadt, L.L.P.

(57) ABSTRACT

According to one embodiment, a training system includes a first generator, a second generator, a third generator, and a trainer. The first generator uses a human body model to generate a first image. The human body model models a human body and is three-dimensional and virtual. The second generator generates a teacher image by annotating body parts of the human body model in the first image. The third generator generates a second image including noise by performing, on the first image, at least one selected from first processing, second processing, third processing, fourth processing, or fifth processing. The trainer uses the second image and the teacher image to train a first model.

20 Claims, 27 Drawing Sheets

(51) Int. Cl.
*G06V 10/774* (2022.01)
*G06V 10/778* (2022.01)
*G06V 10/82* (2022.01)
*G06V 40/10* (2022.01)
*G06V 40/20* (2022.01)

(56) References Cited

U.S. PATENT DOCUMENTS

2020/0167161 A1* 5/2020 Planche .................. G06F 9/328
2021/0038974 A1* 2/2021 Ohashi .................. A63F 13/428

FOREIGN PATENT DOCUMENTS

| JP | 2019-053626 A | 4/2019 |
| WO | WO 2017/187641 A1 | 11/2017 |
| WO | WO 2019/032481 A1 | 2/2019 |

OTHER PUBLICATIONS

Qin Xiangxiang et al., "Automated Segmentation Based on Residual U-Net Model for MR Prostate Images", 2018 11th International Congress on Image and Signal Processing, BioMedical Engineering and Informatics (CISP-BMEI), Oct. 15, 2018, 6 pages.

* cited by examiner

TRAINING SYSTEM AND ANALYSIS SYSTEM

CROSS-REFERENCE TO RELATED APPLICATIONS

This application is based upon and claims the benefit of priority from Japanese Patent Application No. 2019-166910, filed on Sep. 13, 2019; the entire contents of which are incorporated herein by reference.

FIELD

Embodiments described herein relate generally to a training system and an analysis system.

BACKGROUND

There is a model that annotates body parts of a person when an image of the person is input. It is desirable to increase the accuracy of annotating the body parts in such a model.

DETAILED DESCRIPTION

Figure 1:
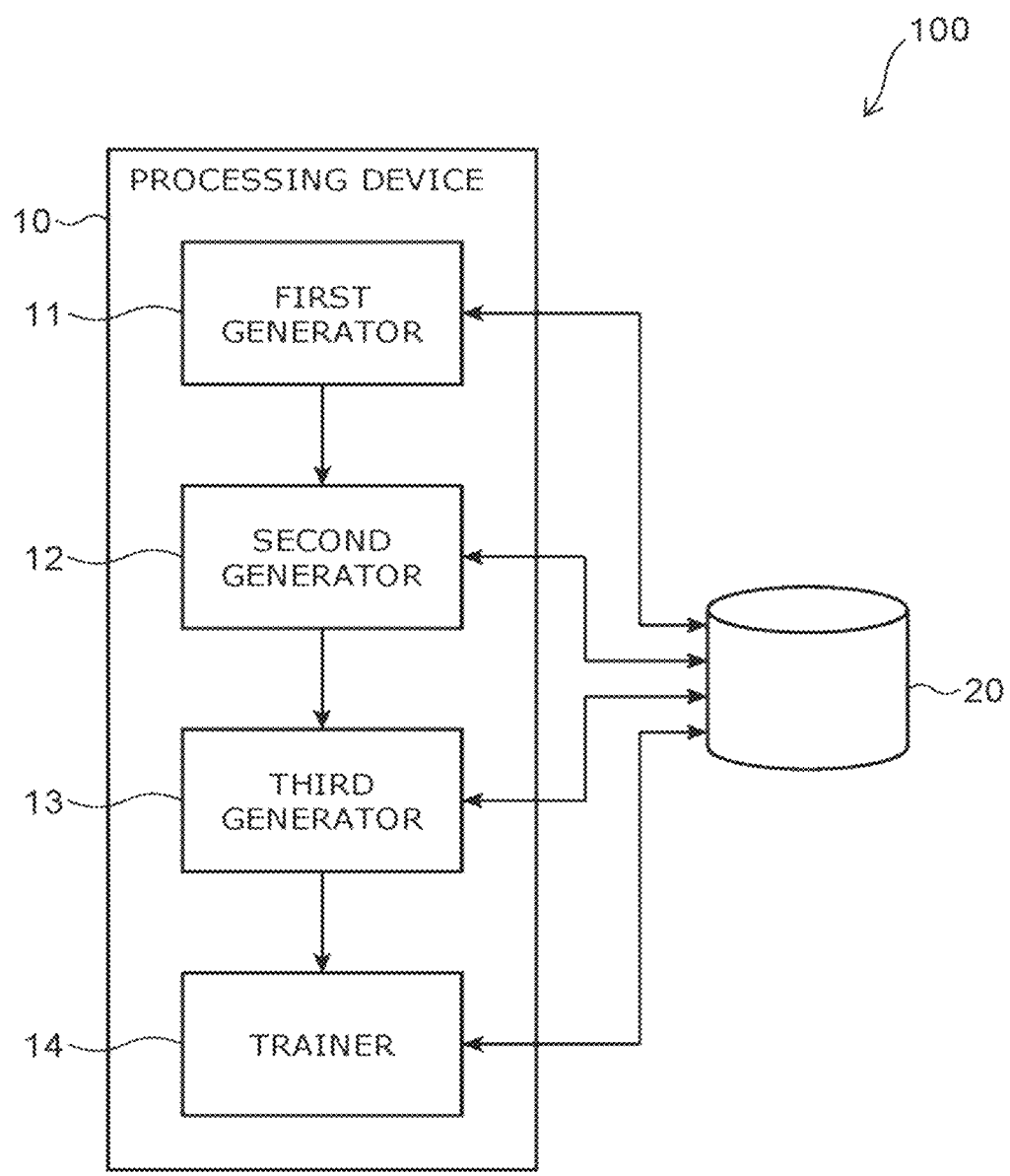
FIG. 1 is a schematic block diagram illustrating a configuration of a training system according to a first embodiment.

According to one embodiment, a training system includes a first generator, a second generator, a third generator, and a trainer. The first generator uses a human body model to generate a first image. The human body model models a human body and is three-dimensional and virtual. The second generator generates a teacher image by annotating body parts of the human body model in the first image. The third generator generates a second image including noise by performing, on the first image, at least one selected from first processing, second processing, third processing, fourth processing, or fifth processing. The third generator, in the first processing, deletes a pixel along an edge of the first image. The third generator, in the second processing, deletes a pixel along a contour of the human body model in the first image. The third generator, in the third processing, adds fluctuation to a pixel value of the first image. The third generator, in the fourth processing, adds a figure to the first image. The third generator, in the fifth processing, synthesizes an image of real space with a periphery of the human body model included in the first image. The trainer uses the second image and the teacher image to train a first model.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic block diagram illustrating a configuration of a training system according to a first embodiment.

FIGS. 2A to 6 are drawings for describing processing according to the training system according to the first embodiment.

As illustrated in FIG. 1, the training system 100 according to the first embodiment includes a processing device 10 and a memory device 20. The processing device 10 includes a first generator 11, a second generator 12, a third generator 13, and a trainer 14.

The first generator 11 generates a first image. The first image is generated using a human body model that is three-dimensional and virtual and models a human body. Software for generating three-dimensional model data is used to generate the human body model. The software can include MakeHuman. For example, the first image is generated by rendering the human body model. The first generator 11 stores the generated first image in the memory device 20.

An environment model also may be used when generating the first image. The environment model is generated by modeling an environment in which a person in real space exists as described below. For example, articles (equipment, fixtures, products, etc.), a floor, walls, etc., are set as the environment. When the environment model is used, the first image is generated by rendering the environment model and the human body model located in the environment model. Or, the first image may be generated by separately rendering the human body model and the environment model and by synthesizing the human body model and the environment model. For example, a three-dimensional figure such as a rectangular parallelepiped used to model a desk, rectangular parallelepipeds, columnar figures, or conic figures used to model equipment, materials, or products on the desk, etc., can be used as the environment model. Blender can be used to generate the environment model. For example, a human body model that is generated by MakeHuman is read into a Blender application, and an environment model is added using this application. The first image can be generated by rendering the human body model and the environment model after adding the environment model.

Figure 2A:
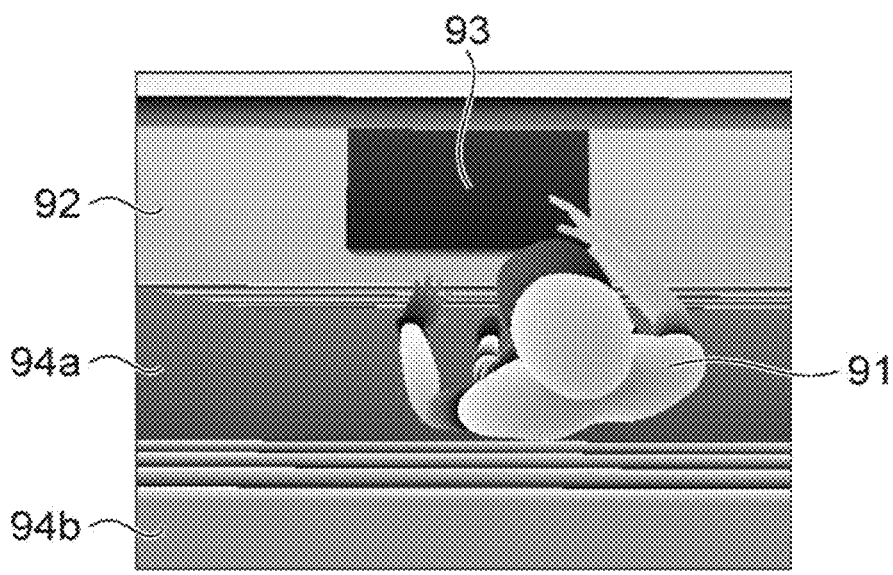
FIGS. 2A to 2C are drawings for describing processing according to the training system according to the first embodiment.
Figure 2B:
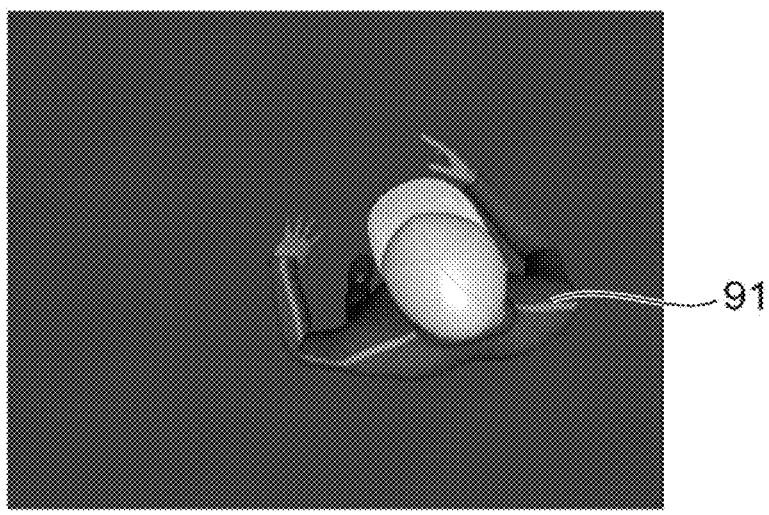

The first image is, for example, a depth image including depth information. In the depth image, each pixel value indicates the distance from a reference position to an object. Or, the pixel values of the first image may represent colors represented by RGB color space, HSV color space, HSL color space, grayscale, etc. FIG. 2A illustrates an example in which the first image is generated as a depth image. FIG. 2B illustrates in an example in which a grayscale first image is generated. Here, the first image is generated using an environment model that includes a human body model 91, a table 92, an article 93, a floor 94a, and a wall 94b. FIG. 2B illustrates the first image in which the environment model is not illustrated and only the human body model 91 is used. These first images illustrate the appearance of the human body model and the environment model when viewed from above.

Figure 2C:
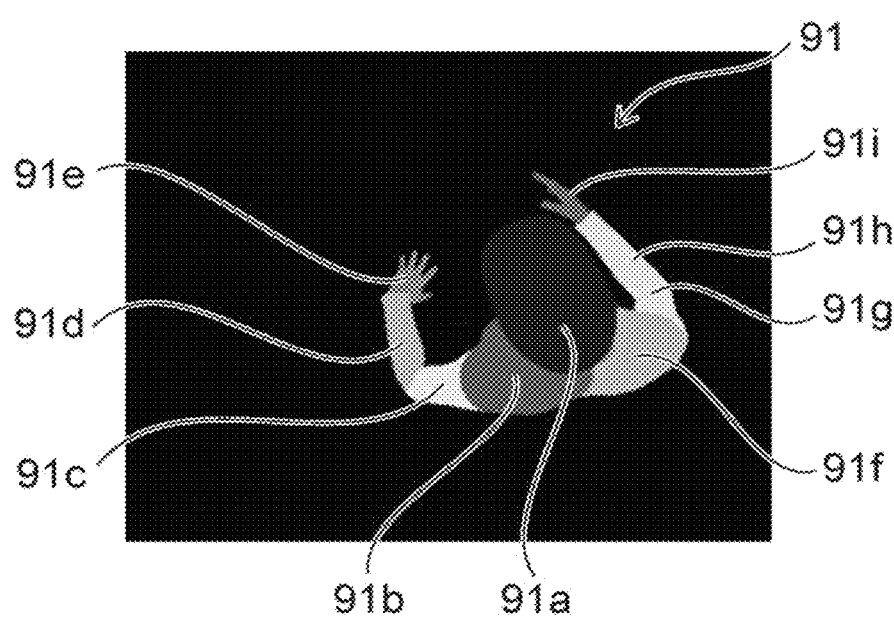

The second generator 12 generates a teacher image by annotating each body part of the human body model included in the first image. For example, information for discriminating the body parts is attached to the human body model. The second generator 12 annotates the body parts based on the information. The body parts can be discriminated in the image by the annotations. As an example, when the first image illustrates the human body model when viewed from above, the head, the shoulders, the upper arms, the forearms, and the hands are annotated with different colors in the teacher image to be discriminable. When the first image illustrates the human body model from the front, the head, the neck, the shoulders, the upper arms, the forearms, the trunk, the thighs, the lower legs, and the feet are annotated with different colors in the teacher image to be discriminable. FIG. 2C is an example of a colorized teacher image corresponding to FIGS. 2A and 2B.

A head 91$a$, a left shoulder 91$b$, a left upper arm 91$c$, a left forearm 91$d$, a left hand 91$e$, a right shoulder 91$f$, a right upper arm 91$g$, a right forearm 91$h$, and a right hand 91$i$ of the human body model 91 are shown in the example of FIG. 2C.

Or, the second generator 12 may show the centroids of the body parts as annotations. For example, the second generator 12 calculates the centroid of the region of each body part in the first image. The second generator 12 generates the teacher image by overlaying the centroids of the body parts in the first image. Or, the second generator 12 may show joints corresponding to the body parts as the annotations. For example, the second generator 12 determines the sites where the body parts connect to each other to be the joints. The second generator 12 generates the teacher image by overlaying the joints corresponding to the body parts in the first image.

The second generator 12 may annotate by combining two or more of the colorization of the body parts, the designation of the centroids, or the designation of the joints. The second generator 12 stores the generated teacher image in the memory device 20.

The memory device 20 may store position data of the positions of the body parts at some time. The position data is obtained by directly or indirectly detecting the positions of the body parts of a person in real space. For example, the position detection of the body parts can be performed using a motion capture system such as Perception Neuron by Noitom, etc.

To simplify the description hereinbelow, the combination of the positions of the body parts also is called the "pose". For example, the first generator 11 uses the position data to generate the first image. Specifically, the first generator 11 sets the positions of the body parts of the human body model to match the position data. In other words, the first generator 11 causes the human body model in the computer to have the same pose as a person in real space. The first generator 11 uses the human body model of which the pose is set to generate the first image. The second generator 12 annotates the body parts of the human body model included in the first image.

For example, the memory device 20 stores multiple position data. The multiple position data is of the pose of the person in real space at multiple mutually-different times. The first generator 11 uses the multiple position data to make various changes to the pose of the human body model. The first generator 11 and the second generator 12 use the human body model to generate the first image and the teacher image each time the pose of the human body model is set. Multiple mutually-different first images and multiple teacher images corresponding respectively to the multiple first images are obtained thereby.

As described above, the first image is generated using the human body model. Therefore, there is no disturbance of the pixel values, missing pixels, etc., in the first image. Here, unintended elements such as disturbance of the pixel values, missing pixels, etc., are called noise. The third generator 13 uses the first image to generate a second image to include noise. For example, the third generator 13 generates the second image by performing at least one selected from the following first to fifth processing.

Figure 3A:
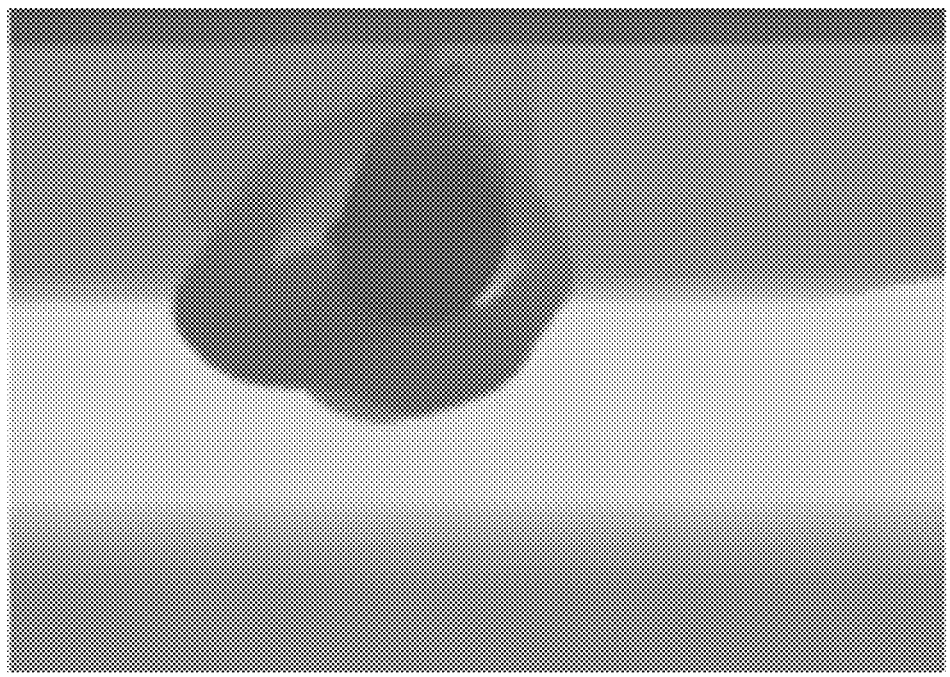
FIGS. 3A and 3B are drawings for describing processing according to the training system according to the first embodiment.
Figure 3B:
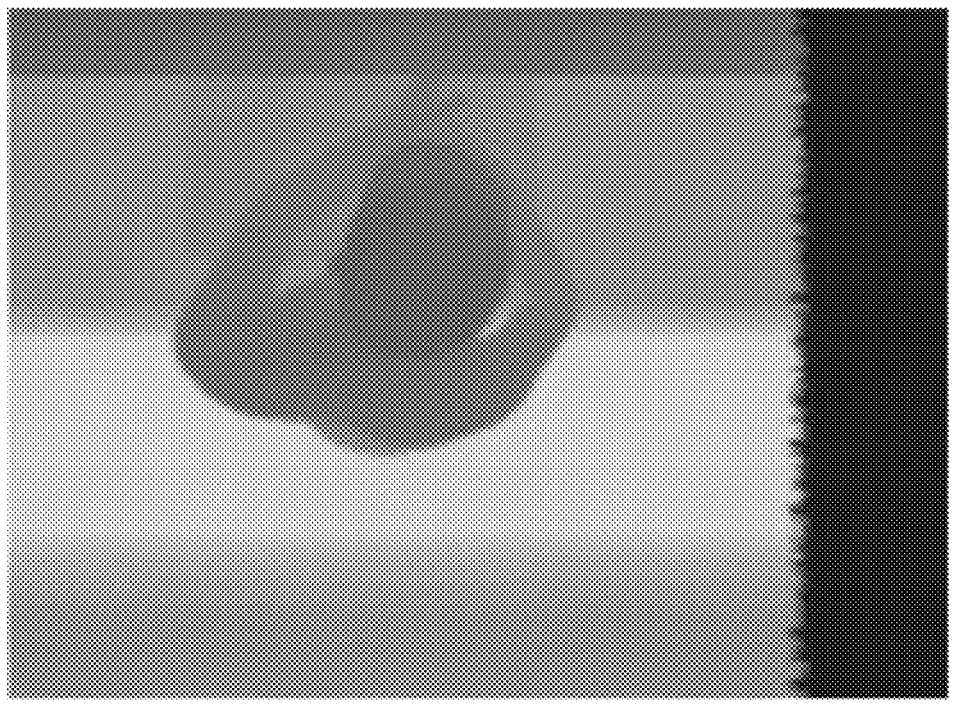

In the first processing, the third generator 13 deletes a pixel along an edge of the first image. FIG. 3A is an example of the first image. FIG. 3B is an example of the second image generated by the first processing. In the example, pixels along the right edge are deleted.

For example, the third generator 13 adds noise to the first image according to the following Formulas 1 to 5.

$$D_{MPA1}(i, j, D_{in}) \triangleq \begin{cases} 0 & C_{\#} \\ D_{in}(i, j) & \text{otherwise} \end{cases} \quad \text{[Formula 1]}$$

$$C_{left} \triangleq 0 \leq j \leq \delta_1 + \frac{1}{2}\delta_2(i) + \sum_{n=1}^{i}\delta_2(n)\left(\frac{1}{2}\right)^{i-n+1} \quad \text{[Formula 2]}$$

$$C_{right} \triangleq w - \delta_1 - \frac{1}{2}\delta_2(i) - \sum_{n=1}^{i}\delta_2(n)\left(\frac{1}{2}\right)^{i-n+1} \leq j \leq w \quad \text{[Formula 3]}$$

$$C_{top} \triangleq 0 \leq i \leq \delta_1 + \frac{1}{2}\delta_2(j) + \sum_{n=1}^{i}\delta_2(n)\left(\frac{1}{2}\right)^{j-n+1} \quad \text{[Formula 4]}$$

$$C_{down} \triangleq h - \delta_1 - \frac{1}{2}\delta_2(j) - \sum_{n=1}^{i}\delta_2(n)\left(\frac{1}{2}\right)^{j-n+1} \leq i \leq h. \quad \text{[Formula 5]}$$

In Formulas 1 to 5, w is the width of the image (the number of pixels in the lateral direction). h is the height of the image (the number of pixels in the vertical direction). i is the lateral direction coordinate of the image and is not less than 0 and not more than w. j is the vertical direction coordinate of the image and is not less than 0 and not more than h. $D_{in}$ is the pixel value at the coordinate (i, j). $C_{\#}$ is one randomly selected from $C_{left}$, $C_{right}$, $C_{top}$, and $C_{down}$ shown in Formulas 2 to 5. $\delta_1$ and $\delta_2$ are randomly determined each time the first processing is performed. The range of the values used as $\delta_1$ and the range of the values used as $\delta_2$ are preset. For example, $\delta_1$ is randomly determined from values not less than 20 and not more than 50. $\delta_2$ is randomly determined from values not less than 0 and not more than 15.

$\delta_1$ and $\delta_2$ are preset. The width of the deleted region can be controlled by adjusting $\delta_1$ and $\delta_2$. $D_{MPA1}(i, j, D_{in})$ represents a pixel value along one edge randomly selected from the right, left, upper, and lower sides of the image being set to zero (the pixel being deleted).

The third generator 13 may delete a portion of the region of the human body model when the human body model is positioned proximate to the edge in the first image. Or, when the region of the human body model in the first image is known, the third generator 13 may perform the first processing so that the region of the human body model is not deleted.

In the second processing, the third generator 13 deletes a pixel along the contour included in the first image. First, the third generator 13 detects contours included in the first image. A first-order differential filter can be used to extract the contours. The third generator 13 randomly deletes pixels along the contours. In other words, pixels are deleted at one portion of a contour, but pixels are not deleted at another portion of the contour. The contours that have pixels to be deleted may include not only the contours of the human body model but also contours of the environment model. Information of the contours of the human body model may be stored in the memory device 20 when generating the first image by rendering the human body model. In such a case, the third generator 13 may randomly delete pixels along the contours of the human body model from the information without extracting the contours.

As one specific example, the third generator 13 generates $N_c$ circles uniformly dispersed along the contour. $N_c$ is preset. For example, $N_c$ is set to 30. The positions of the circles are randomly determined. A diameter r is uniform for the circles. The diameter r is randomly determined. The range of the values used as r is preset. For example, r is randomly determined from values not less than 0 and not more than 20. As illustrated in the following Formula 6, the third generator 13 sets the pixel values inside the circles to 0.

$$D_{MPA2}(i, j, D_{in}) \triangleq \begin{cases} 0 & \text{if inside the deletion region} \\ D_{in}(i, j) & \text{otherwise} \end{cases} \quad \text{[Formula 6]}$$

In the third processing, the third generator 13 adds fluctuation to the pixel values of the first image. For example, when the first image includes depth information as the pixel values, the third generator 13 adds fluctuation to the depth of at least a portion of the pixels.

In the fourth processing, the third generator 13 adds a figure to the first image. The shape, the size, the depth (or the color), etc., of the figure are appropriately set according to the environment in real space. For example, the third generator 13 generates the second image by adding at least one rectangle to the first image. Other than a rectangle, the third generator 13 may add a polygon, a circle, an ellipse, an annulus, etc.

As one specific example, the third processing is performed according to the following Formulas 7 and 8. The fourth processing is performed according to the following Formulas 7 and 9.

$$D_{ANA\#}(i,j,D_{in}) \triangleq D_{in}(i,j) + \text{round}(f_{\#}(i,j)) \quad \text{[Formula 7]}$$

$$f_{ANA1}(i,j) = \alpha D_u \quad \text{[Formula 8]}$$

$$f_{ANA2}(i,j) = D_r \quad \text{[Formula 9]}$$

$f_{\#}(i, j)$ represents Formula 8 or 9. In other words, when performing the third processing, the value that is obtained in Formula 8 is substituted for $f_{\#}(i, j)$ of Formula 7. When performing the fourth processing, the value that is obtained in Formula 9 is substituted in $f_{\#}(i, j)$ of Formula 7.

α of Formula 8 is a value that is not less than −1 and not more than 1 and is randomly determined. $D_u$ represents the maximum value of the fluctuation. From Formulas 7 and 8, the value of the maximum value of the fluctuation multiplied by a value that is not less than −1 and not more than 1 is added for each pixel.

$D_r$ of Formula 9 is the depth of the figure added in the first image. For example, the shape, the width, the height, and the number of the figures are preset. The third generator 13 randomly and uniformly disperses the centers of the figures.

Figure 4A:
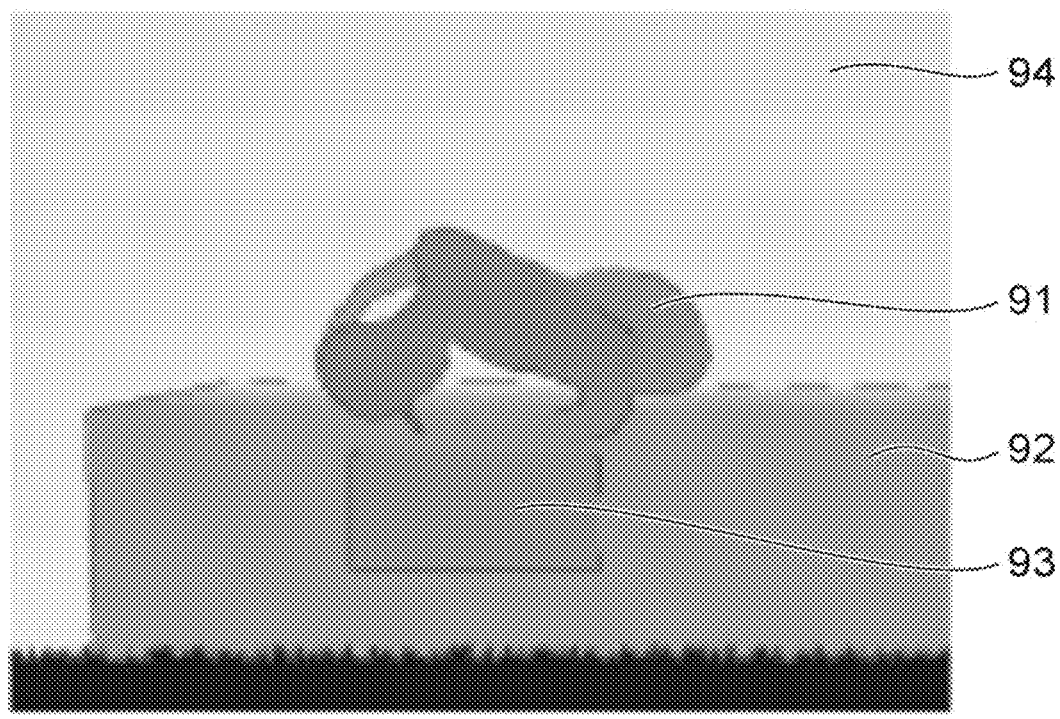
FIGS. 4A and 4B are drawings for describing processing according to the training system according to the first embodiment.
Figure 4B:
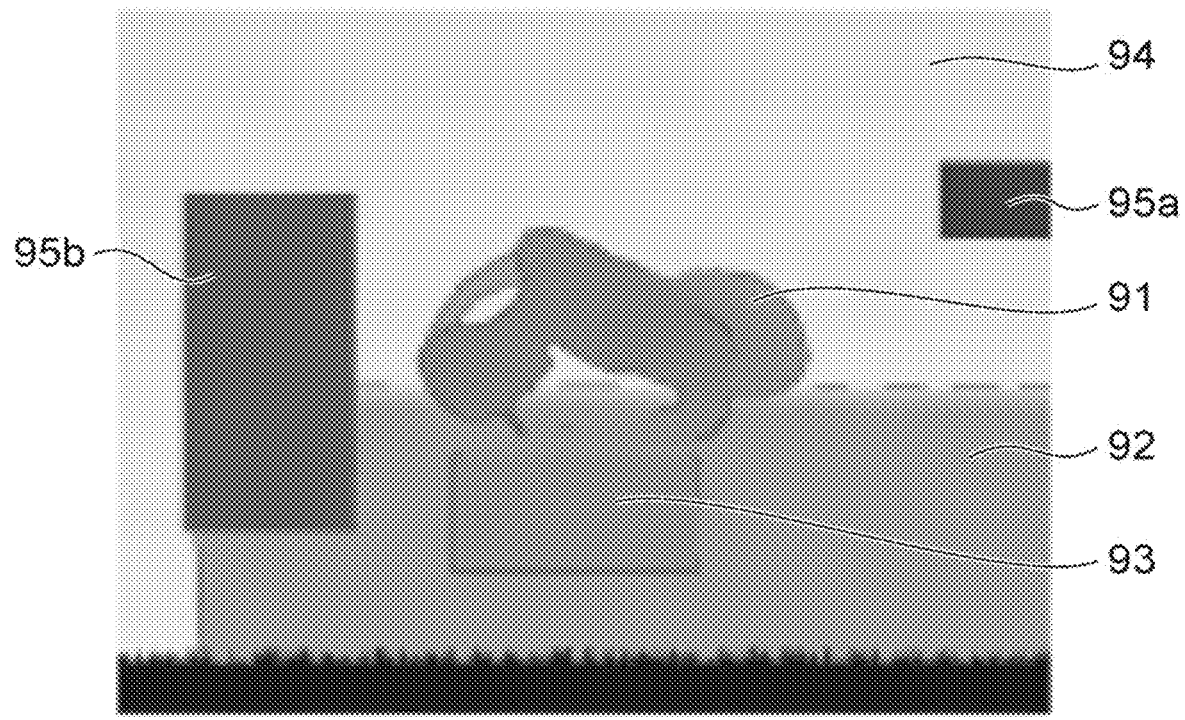

FIG. 4A is an example of the second image on which the first processing is performed and pixels along the lower side are deleted. FIG. 4B is an example of the second image generated by also performing the fourth processing on the image of FIG. 4A. In the example of FIG. 4A, the human body model 91, the table 92, the article 93, and a floor 94 are included in the first image. In the second image, FIGS. 95a and 95b are added to these elements.

In the fifth processing, the third generator 13 synthesizes an image of real space with the periphery of the human body model included in the first image. For example, when the image is generated by rendering the human body model, the third generator 13 superimposes the image of the human body model on the image of real space. The second image is generated thereby. Fluctuation of the pixel values exists in the image of real space. The second image that includes fluctuation of the pixel values of the periphery of the human body model is generated by the fifth processing.

Figure 5A:
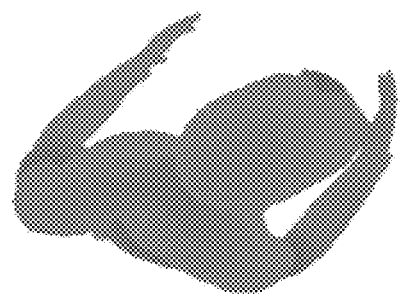
FIGS. 5A and 5B are drawings for describing processing according to the training system according to the first embodiment.
Figure 5B:
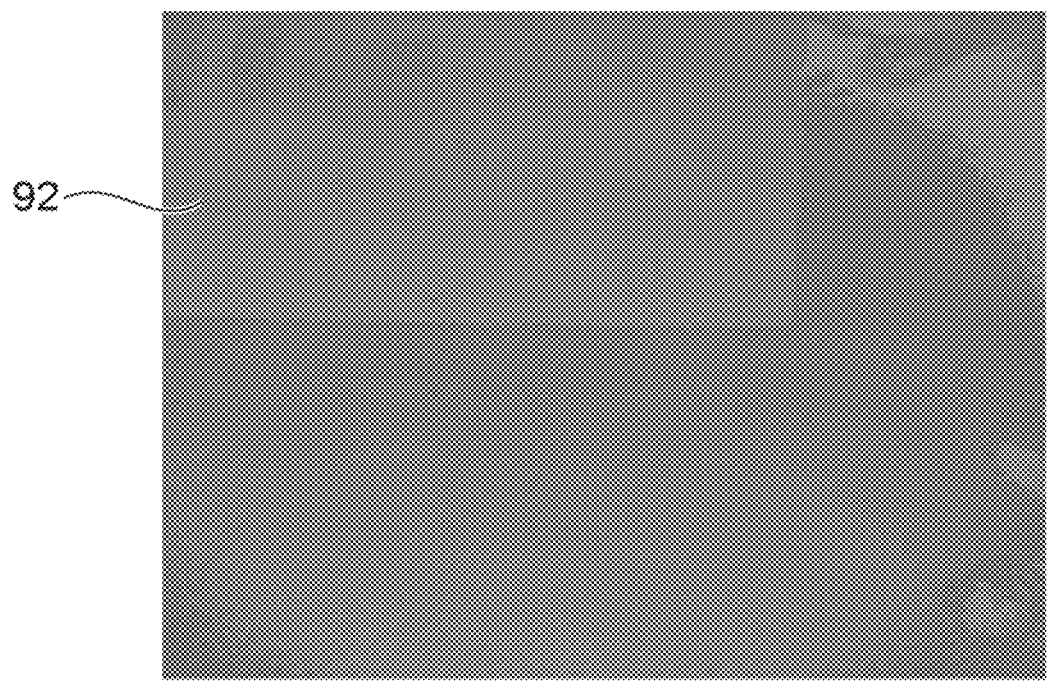
Figure 6:
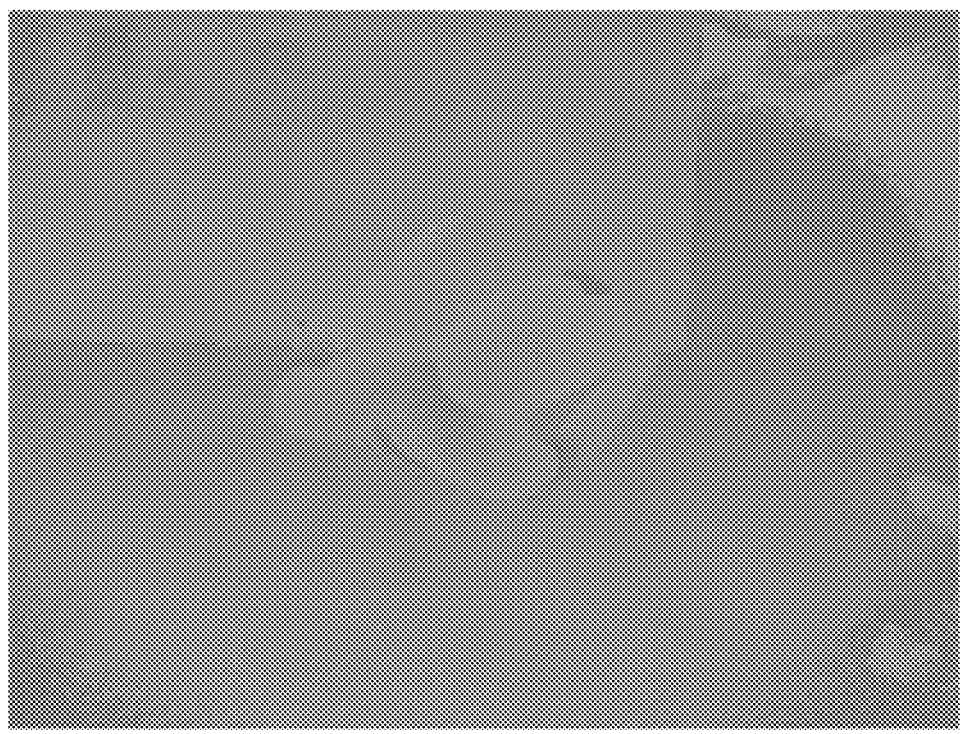
FIG. 6 is a drawing for describing processing according to the training system according to the first embodiment.

FIG. 5A is an example of the first image obtained by rendering the human body model. FIG. 5B is an example of the image of real space. In the example, the table 92 is imaged in the image of FIG. 5B. It can be seen that the image is disturbed at the outer perimeter of the image of FIG. 5B. FIG. 6 is an example of the second image obtained by synthesizing the images illustrated in FIGS. 5A and 5B. As illustrated in FIG. 6, an image of the human body model to which the noise is added is obtained by the synthesis.

The third generator 13 stores the generated second image in the memory device 20. When the first generator 11 generates multiple first images, the third generator 13 generates the second image for each of the first images.

The trainer 14 trains a first model by using the second image based on the first image as input data and by using a teacher image corresponding to the first image as teacher data. The first model includes, for example, a neural network. The first model may include a decision tree or a random forest. When multiple second images and multiple teacher images are generated, sets of the corresponding second image and teacher image are sequentially used to train the first model.

Thereby, the first model is trained so that when an image of a person is input, a result in which the parts of the person are annotated to show corresponding body parts is output. In other words, the first model is trained to perform semantic segmentation. The trainer 14 stores the trained first model in the memory device 20.

Figure 7:
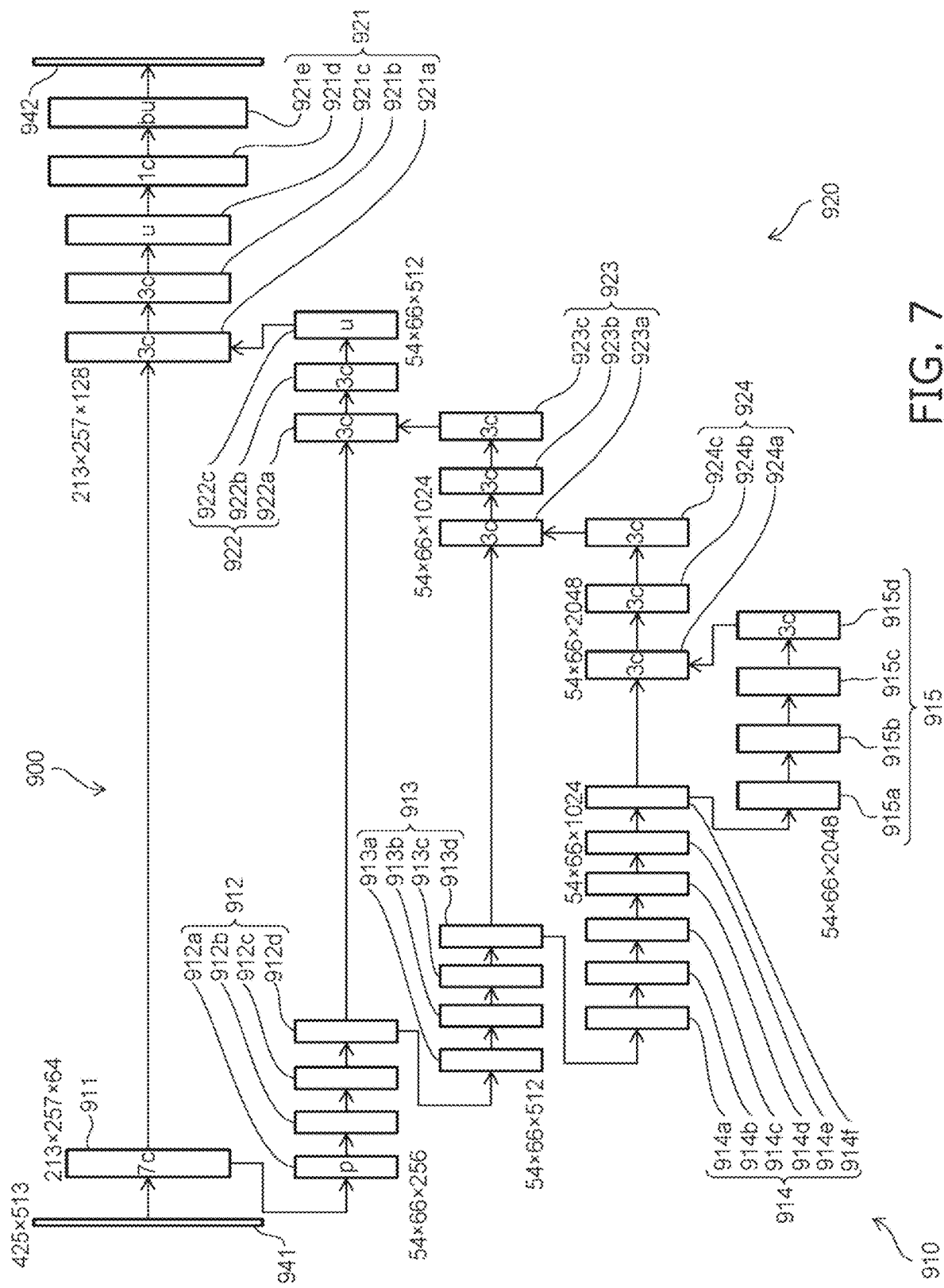
FIG. 7 is a schematic view illustrating a neural network used in the training system according to the first embodiment.

FIG. 7 is a schematic view illustrating a neural network used in the training system according to the first embodiment.

Figure 8:
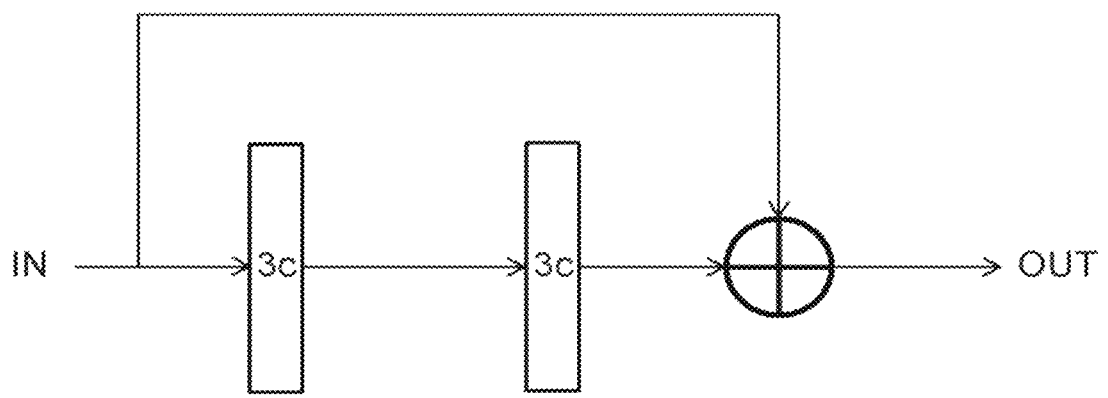
FIG. 8 is a schematic view illustrating a portion of the neural network used in the training system according to the first embodiment.

FIG. 8 is a schematic view illustrating a portion of the neural network used in the training system according to the first embodiment.

Favorably, the first model includes a neural network. The accuracy of annotating the body parts can be increased by using a neural network. The configuration of the neural network is arbitrary. To extract the features of the image with higher accuracy, it is favorable for the neural network to include convolutional layers. An example of a particularly favorable configuration of a neural network will now be described.

A neural network 900 illustrated in FIG. 7 includes an encoder path 910 and a decoder path 920. In at least a portion of the encoder path 910, at least one of convolution processing or pooling processing of the data is performed, and the data is reduced. The data is enlarged in at least a portion of the decoder path 920.

Specifically, the encoder path 910 includes blocks 911 to 915. The decoder path 920 includes blocks 921 to 924. For example, the blocks 912 to 915 and 921 to 924 each include multiple sub-blocks.

In the example of FIG. 7, convolution processing 7c of size 7 wide×7 high is performed in the block 911. For example, when the data size of an input image 941 is 425 pixels wide×513 pixels high, the input image 941 is reduced to a feature map of size 213 wide×257 high in the block 911. For example, the block 911 includes 64 kernels of size 213 wide×257 high×1 thick. The block 911 outputs (holds) 64 feature maps of size 213 wide×257 high. The feature maps that are output from the block 911 are input to the block 912 and input to the block 921.

The block 912 includes sub-blocks 912a to 912d. Pooling processing p of the feature maps output from the block 911 is performed in the sub-block 912a. Thereby, the feature map size is further reduced to 54 wide×66 high.

In the neural network 900, the encoder path 910 includes residual blocks. Prescribed arithmetic processing is performed in the residual blocks. The arithmetic processing includes arithmetic using the feature maps that are the output result of the convolution processing performed by the residual blocks and the feature maps input to the residual blocks. The arithmetic is addition, etc. For example, as illustrated in FIG. 8, when a feature map IN is input to the residual blocks, convolution processing 3c is performed multiple times. The convolved feature map and the unprocessed feature map IN are calculated, and a feature map OUT is output.

In the example of FIG. 7, the sub-blocks 912b to 912d of the block 912, sub-blocks 913a to 913d of the block 913, sub-blocks 914a to 914f of the block 914, and sub-blocks 915a to 915c of the block 915 function as residual blocks.

For example, as illustrated in FIG. 7, the four sub-blocks 913a to 913d that function as residual blocks are provided in the block 913. In these sub-blocks, the number of kernels used in the convolution is 512, and 512 feature maps are output. Similarly, the six sub-blocks 914a to 914f that function as residual blocks are provided in the block 914. These sub-blocks use 1024 kernels to output 1024 feature maps. The three sub-blocks 915a to 915c that function as residual blocks are provided in the block 915. These sub-blocks use 2048 kernels to output 2048 feature maps. The block 915 further includes a sub-block 915d that performs the convolution processing 3c of size 3 wide×3 high.

The reduction or the enlargement of the feature map is not performed in the blocks 912 to 915. Accordingly, the sizes of the feature maps input to the residual blocks, the sizes of the feature maps output from the residual blocks, and the sizes of the feature maps output between the residual blocks are the same.

The feature maps that are output from the block 912 are input to the block 913 and input to the block 922. The feature maps that are output from the block 913 are input to input to the block 914 and input to the block 923.

The feature maps that are output from the block 914 and the feature maps that are output from the block 915 are input to the block 924. Specifically, the feature maps that are output from the block 914 and the block 915 are superimposed, and the following convolution processing is performed. For example, the block 924 includes sub-blocks 924a to 924c, and each performs the convolution processing 3c. 1024 feature maps of size 54 wide×66 high output from the blocks 914 and 2048 feature maps of size 54 wide×66 high output from the block 915 are input to the sub-block 924a. The sub-block 924a includes 2048 kernels of size 3 wide×3 high×3072 thick to process these feature maps. When performing the convolution processing 3c, for example, zero padding is applied to cause the size of the feature maps output from the block 924 to be equal to the size of the feature maps input to the block 924.

Similarly, the feature maps that are output from the block 913 and the feature maps that are output from the block 924 are input to the block 923. Similarly to the block 924, the block 923 includes sub-blocks 923a to 923c performing the convolution processing 3c in which zero padding is applied. For example, the sub-block 923a includes 1024 kernels of size 3 wide×3 high×2560 thick to process the 512 feature maps of size 54 wide×66 high output from the blocks 913 and the 2048 feature maps of size 54 wide×66 high output from the block 924.

Similarly, the block 922 includes sub-blocks 922a and 922b performing the convolution processing 3c, in which zero padding is applied, to the feature maps output from the block 912 and the feature maps output from the block 923. For example, the sub-block 922a includes 512 kernels of size 3 wide×3 high×1280 thick to process the 256 feature maps of size 54 wide×66 high output from the blocks 912 and the 1024 feature maps of size 54 wide×66 high output from the block 923.

The block 922 further includes a sub-block 922c that performs upsampling processing u of the feature maps output from the sub-block 922b. The feature map size is enlarged to 213 wide×257 high by the upsampling processing u. The block 921 receives inputs of the feature maps output from the block 911 and the feature maps output from the block 922.

The block 921 includes sub-blocks 921a and 921b that perform the convolution processing 3c, a sub-block 921c that performs the upsampling processing u, a sub-block 921d that performs convolution processing 1c of size 1 wide×1 high, and a sub-block 921e that performs upsampling processing bu using a bilinear technique. The feature map size is enlarged by the processing of these sub-blocks. Thereby, an output image 942 that is of size 425 pixels wide×513 pixels high, which is equal to the size of the input image, is output.

The features of the image are extracted by the encoder path 910 reducing the feature map size. The regions that correspond to the features in the image are extracted by the decoder path 920 enlarging the feature map size. By passing the feature maps from the encoder path 910 to the decoder path 920 without reducing, the feature maps can be directly transmitted to the decoder path 920 without degradation of the local features such as the features of the contours included in the image, etc.

By providing the residual blocks, the vanishing gradient problem can be suppressed, and the encoder path 910 that has a deeper network configuration can be configured. Thereby, the accuracy can be increased when extracting regions from the image. That is, the regions of the body parts such as the head, the shoulders, the upper arms, etc., can be designated with higher accuracy.

An example of the number of sub-blocks included in each block and the feature map size processed by each block is shown in FIG. 7. The configuration is not limited to the example; the number of blocks, the configuration of each block, the number of sub-blocks in each block, and the size of the processed feature map are modifiable as appropriate.

For example, it is sufficient for the neural network used in the training system according to the embodiment to include the following configuration. The neural network includes a first block that reduces the data of the input image. In the example of FIG. 7, the first block corresponds to the block 911 in which the convolution processing 7c is performed or the sub-block 912a in which the pooling processing is performed.

This neural network further includes a first residual block to which the feature maps output from the first block are input. The first residual block corresponds to one of the sub-blocks 912b to 912d, 913a to 913d, or 914a to 914f. The data may be input from the first layer to the first residual block via another block.

This neural network further includes a second residual block to which the data output from the first residual block is input. The feature map size output from the second residual block is equal to the feature map size input to the second residual block and the feature map size output from the first residual block. The second residual block corresponds to one of the sub-blocks 915a to 915c. The data may be input from the first residual block to the second residual block via another block.

This neural network further includes a second block to which the feature maps output from the first residual block and the feature maps output from the second residual block are input. The second block corresponds to one of the sub-blocks 924a, 923a, or 922a. The data may be input from the second residual block to the second block via another block.

This neural network further includes a third block to which the feature maps output from the first block and the feature maps output from the second block are input. The third block corresponds to the sub-block 921a. The data may be input from the second block to the third block via another block.

This neural network further includes a fourth block to which the feature maps output from the third block are input. The fourth block enlarges the feature maps and outputs the output image. The fourth block corresponds to the sub-block 921e in which the upsampling processing bu of the block 921 is performed. The data may be input from the third block to the fourth block via another block.

For example, the trainer 14 uses the second image and the teacher image to train the first model including the neural network 900 illustrated in FIG. 7.

Figure 9:
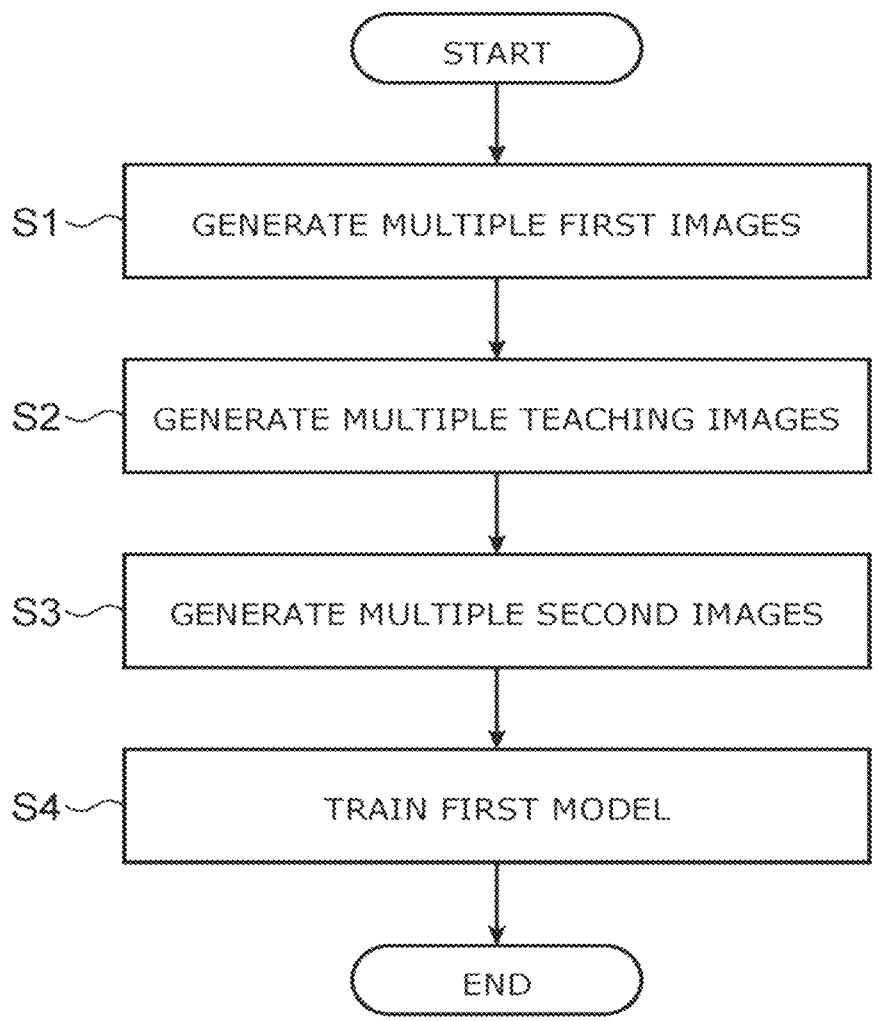
FIG. 9 is a flowchart illustrating the processing according to the training system according to the first embodiment.

FIG. 9 is a flowchart illustrating the processing according to the training system according to the first embodiment.

Here, a case will be described in which multiple second images and multiple teacher images are used to train the first model.

The first generator 11 uses the human body model to generate the multiple first images (step S1). The poses of the human body model imaged in the multiple first images are different from each other.

The second generator 12 generates multiple teacher images corresponding respectively to the multiple first images by annotating the body parts in the multiple first images (step S2). The third generator 13 generates multiple second images by performing at least one of the first to fifth processing on the multiple first images (step S3). The trainer 14 sequentially uses the sets of the corresponding second image and teacher image to train the first model (step S4).

The sequence of the processing according to the training system 100 described above is modifiable as appropriate. For example, step S3 may be performed between steps S1 and S2. Steps S2 and S3 may be performed in parallel. Or, each time one first image is generated, a teacher image and a second image that correspond to the first image may be generated, and the first model may be trained.

Effects of the first embodiment will now be described.

In the training system 100 according to the first embodiment, the first generator 11 uses a three-dimensional human body model to generate the first image. Therefore, the labor of imaging a person in real space is unnecessary when preparing training images including humans.

Also, when images are generated by actual imaging, a large amount of labor is necessary to generate the teacher images corresponding to the images. For example, it is necessary for a human to confirm the image and to annotate the parts of the person in the image with the corresponding body parts. In particular, much teaching data is necessary to sufficiently train the model. In other words, it is necessary to image many images and to confirm and annotate the images.

Conversely, the information of how the multiple points correspond to the body parts is attached to the human body model. By referring to this information, it can be easily discriminated how the parts of the human body model in the first image correspond to the body parts when generating the first image. Based on this information, the second generator 12 can easily generate the teacher images corresponding to the first images.

Thus, according to the training system 100 according to the first embodiment, the data that is necessary for training the first model can be easily prepared.

On the other hand, the following problems arise when using a human body model to generate an image.

Fluctuation of the pixel values, missing pixels, etc., occur when using an imaging device such as a camera or the like to perform actually imaging. Fluctuation of the pixel values and missing pixels do not occur when using a human body model to generate the image. In other words, compared to an actual photograph, an excessively clear image is obtained when a human body model is used.

The trained first model is used to annotate the body parts of the person of real space in the image. In other words, an image that includes noise is input to the trained first model. If the first model is trained using an excessively clear image, the accuracy of annotating the input image decreases due to the effects of noise.

For this problem, in the training system 100 according to the first embodiment, the third generator 13 uses the first image to generate the second image including noise. By adding noise, the first image that is generated using the human body model approaches an image that is actually imaged. The trainer 14 uses the second image to train the first model. Thereby, the effects of the noise such as fluctuation of the pixel values, missing pixels, etc., on the annotation of the body parts can be reduced, and the accuracy of the determination of the body parts by the first model can be increased.

As a result of investigations by the inventor, it was found that the accuracy of the determination of the body parts by the first model can be further increased by performing at least one of the first to fifth processing described above when generating the second image.

FIGS. 10A to 16 are drawings for describing effects of the training system according to the first embodiment.

Figure 10A:
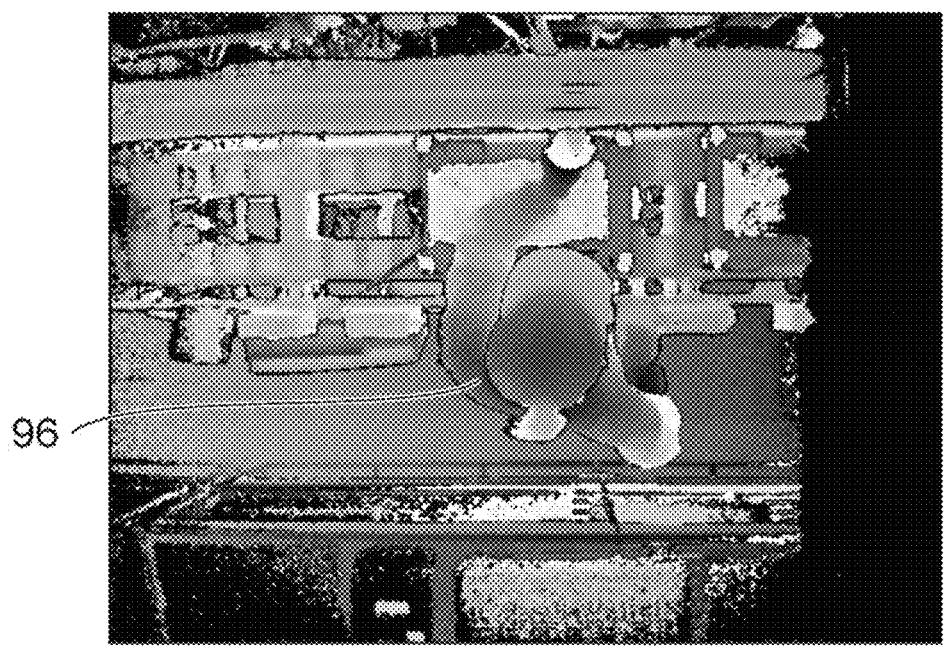
FIGS. 10A and 10B are drawings for describing effects of the training system according to the first embodiment.
Figure 10B:
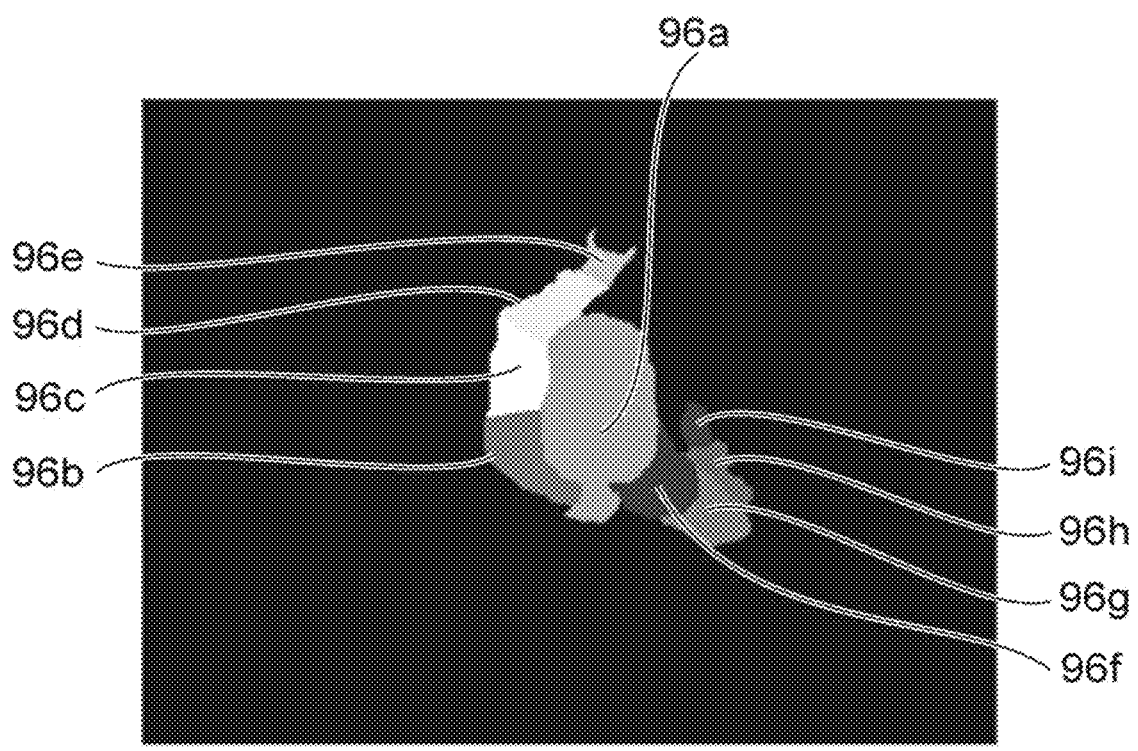

FIG. 10A is a depth image input to the first model. The image of FIG. 10A shows the appearance of a person 96 who wears a hat and is performing the assembly work of a component. The first model annotates the body parts of the person 96 of the image of FIG. 10A. FIG. 10B illustrates the ideal annotation for the image of FIG. 10A. As illustrated in FIG. 10B, a head 96a, a left shoulder 96b, a left upper arm 96c, a left forearm 96d, a left hand 96e, a right shoulder 96f, a right upper arm 96g, a right forearm 96h, and a right hand 96i of the person 96 are imaged in the image illustrated in FIG. 10A.

Figure 11A:
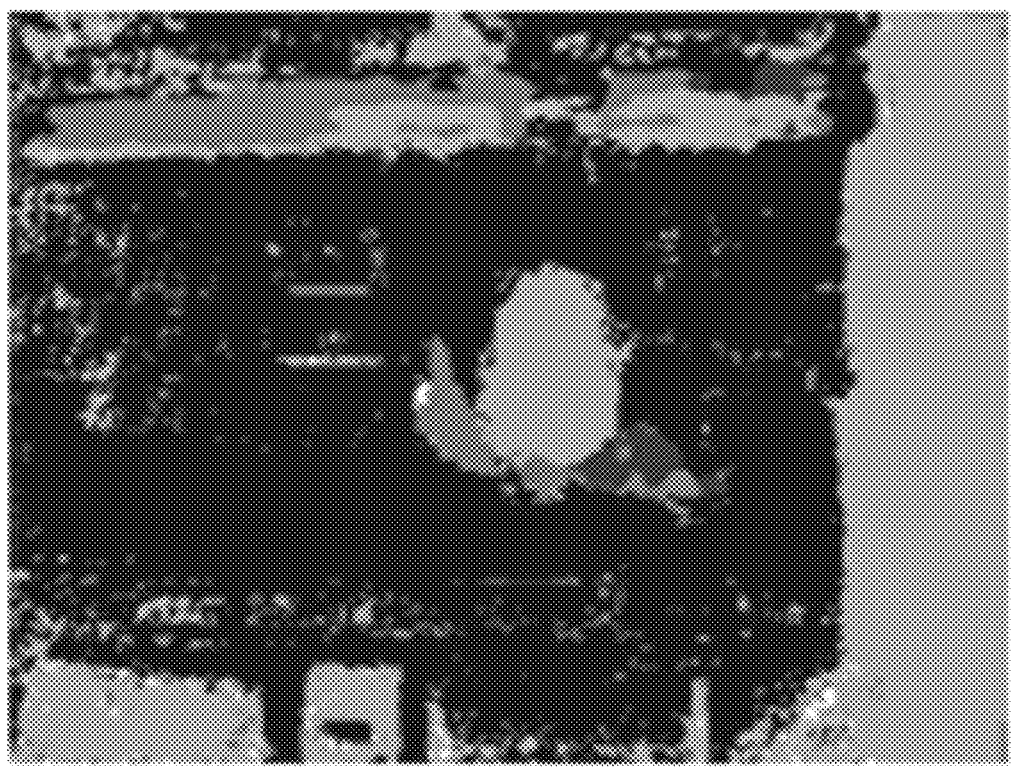
FIGS. 11A and 11B are drawings for describing effects of the training system according to the first embodiment.
Figure 11B:
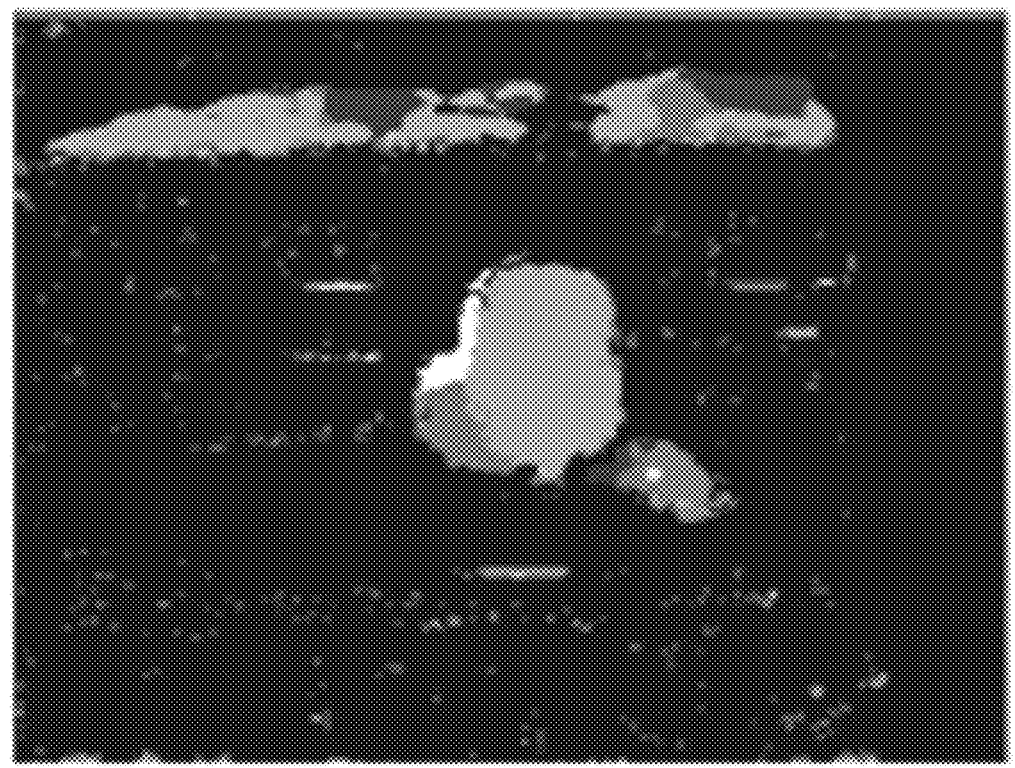
Figure 12A:
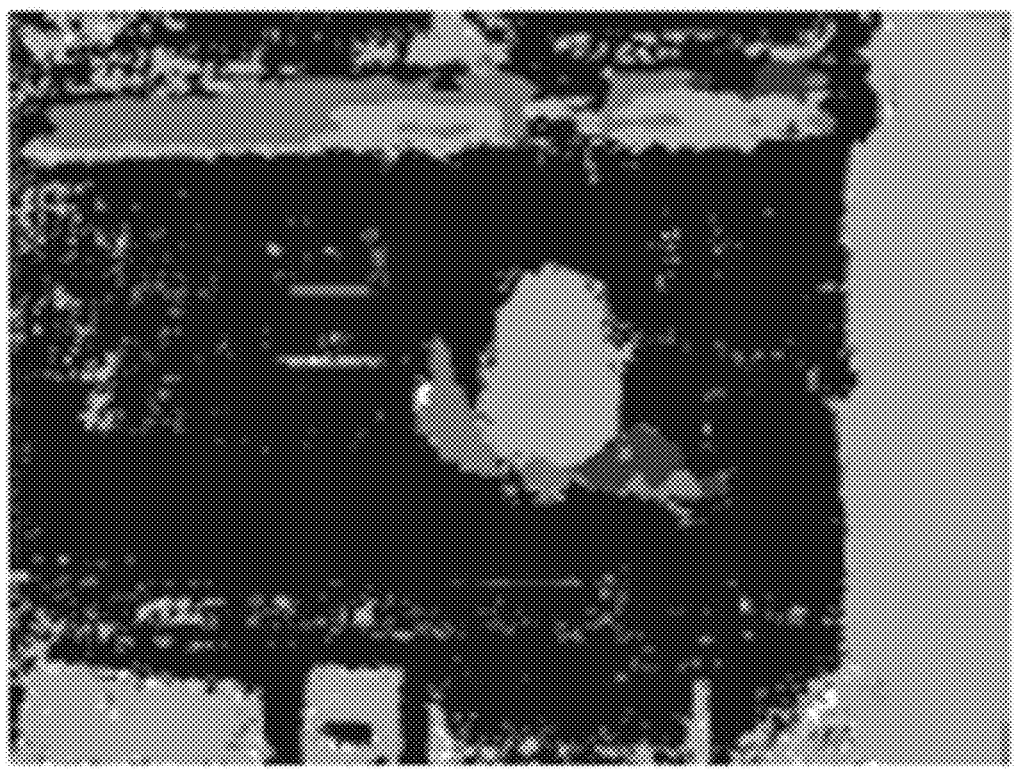
FIGS. 12A and 12B are drawings for describing effects of the training system according to the first embodiment.
Figure 12B:
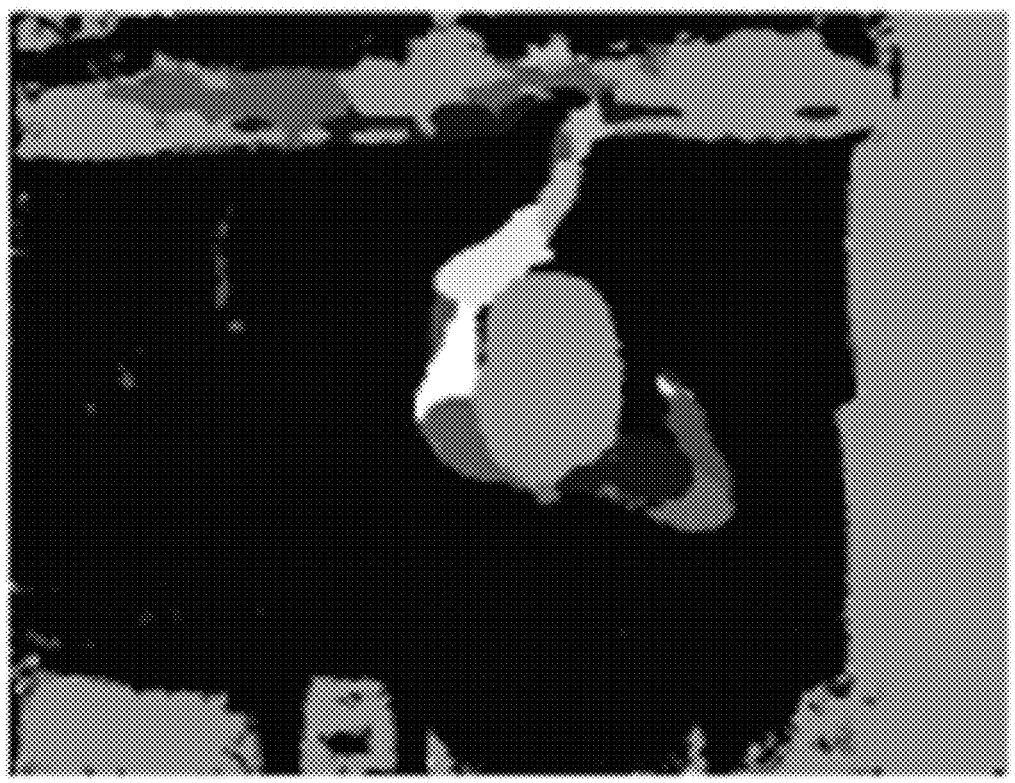

FIGS. 11A and 12A illustrate output results when the image of FIG. 10A is input to the first model trained using the first image. FIG. 11B illustrates the output result when the image of FIG. 10A is input to the first model trained using the second image obtained by performing the first processing. FIG. 12B illustrates the output result when the image of FIG. 10A is input to the model trained using the second image obtained by performing the second processing.

In the output result of FIG. 11A, much of the regions other than the person 96 are erroneously recognized as body parts of the person 96. For the person 96 as well, the head 96a and the left shoulder 96b are recognized, but the other body parts are substantially not recognized.

For the regions other than the person 96 in the output result of FIG. 11B, the surface area of the regions that are erroneously recognized as body parts is greatly reduced. In other words, by using the first processing, the misrecognition of the regions other than the person 96 as body parts can be greatly suppressed. In the output result of FIG. 11B, a portion of the left upper arm 96c, a portion of the left forearm 96d, and the right upper arm 96g also are recognized in addition to the head 96a and the left shoulder 96b.

The regions that are misrecognized as body parts are about the same between the output result of FIG. 12B and the output result of FIG. 12A. On the other hand, for the person 96, the head 96a and the left shoulder 96b are more clearly recognized. The left upper arm 96c, the left forearm 96d, a portion of the left hand 96e, the right upper arm 96g, and the right forearm 96h also are recognized. In other words, by using the second processing, the recognition accuracy of the body parts of the person 96 is greatly increased.

Figure 13A:
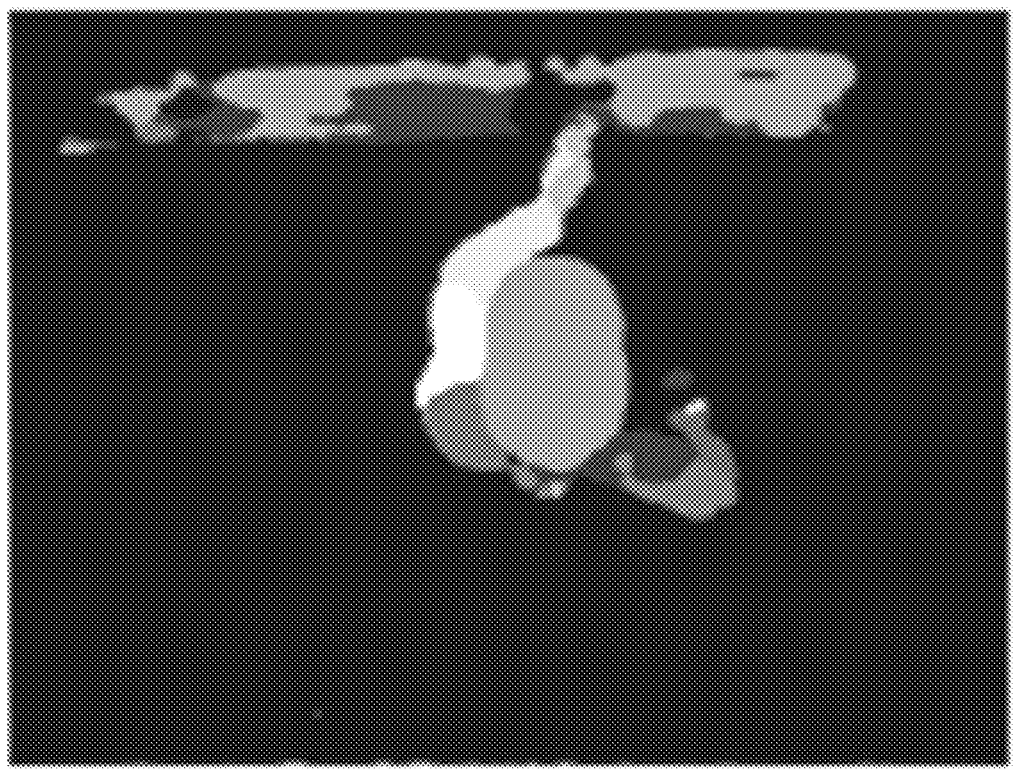
FIGS. 13A and 13B are drawings for describing effects of the training system according to the first embodiment.
Figure 14A:
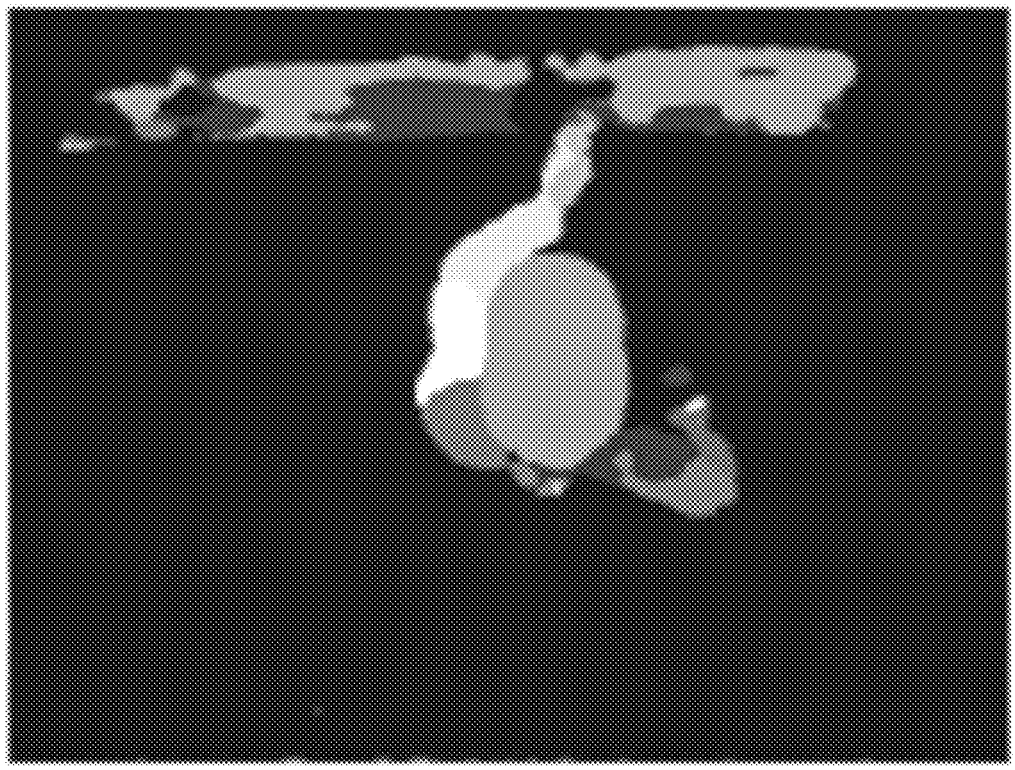
FIGS. 14A and 14B are drawings for describing effects of the training system according to the first embodiment.

FIGS. 13A and 14A illustrate output results when the image of FIG. 10A is input to the first model trained using the second image obtained by performing the first and second processing. By comparing the results of FIGS. 11B, 12B, and 13A, it can be seen that by combining the first and second processing, the misrecognition of regions other than the person 96 as body parts is greatly suppressed, and the recognition accuracy of the body parts of the person 96 is greatly increased.

Figure 13B:
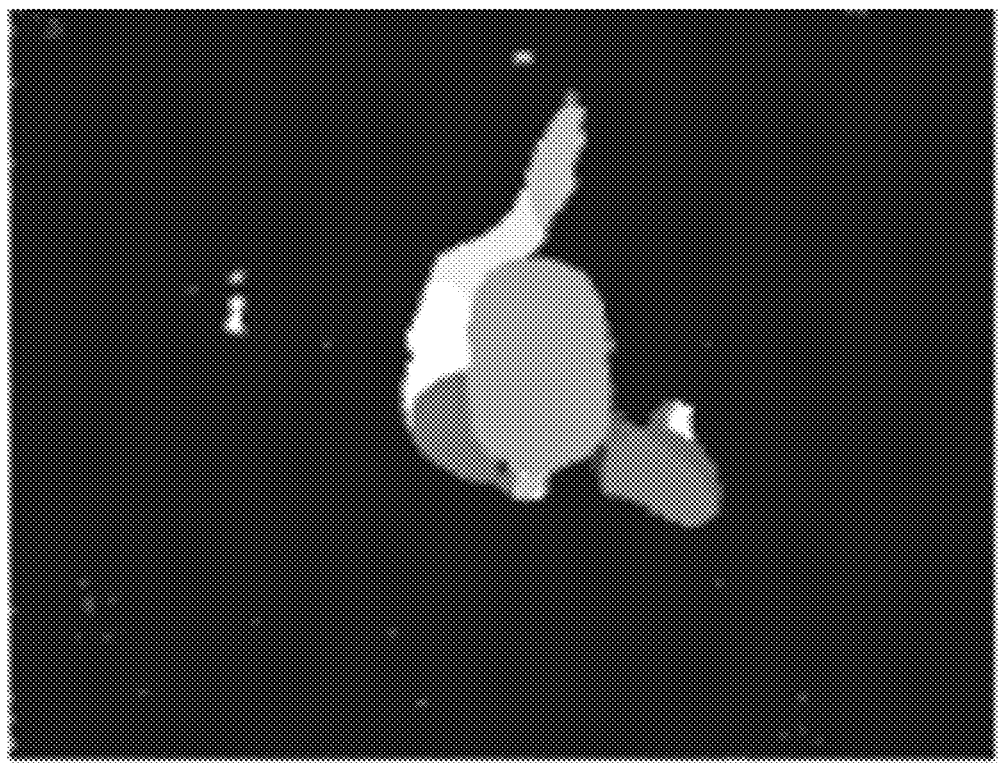
Figure 14B:
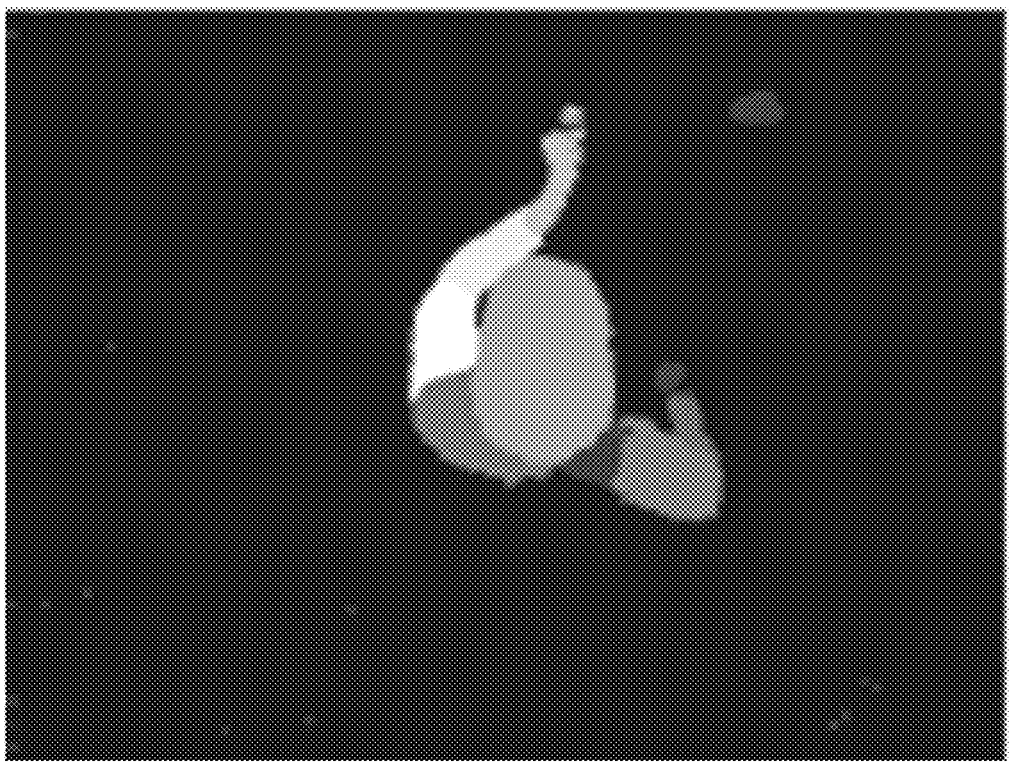

FIG. 13B illustrates the output result when the image of FIG. 10A is input to the first model trained using the second image obtained by performing the first to third processing. FIG. 14B illustrates the output result when the image of FIG. 10A is input to the first model trained using the second image obtained by performing the first, second, and fourth processing. By comparing the output results of FIGS. 13A and 13B and by comparing the output results of FIGS. 14A and 14B, it can be seen that the misrecognition of regions other than the person 96 as body parts is substantially eliminated by also using the third processing or the fourth processing.

Figure 15:
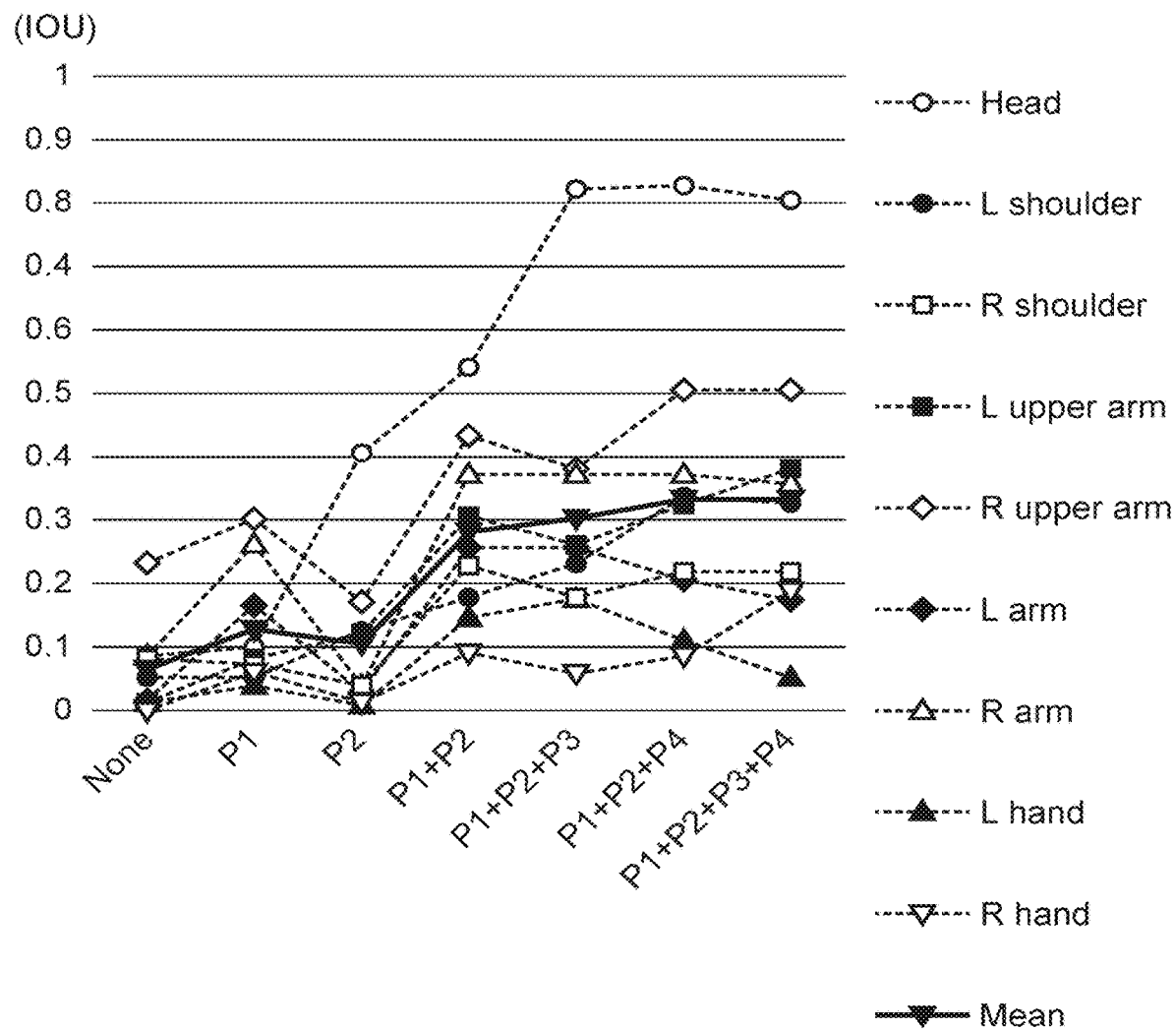
FIG. 15 is a drawing for describing effects of the training system according to the first embodiment.
Figure 16:
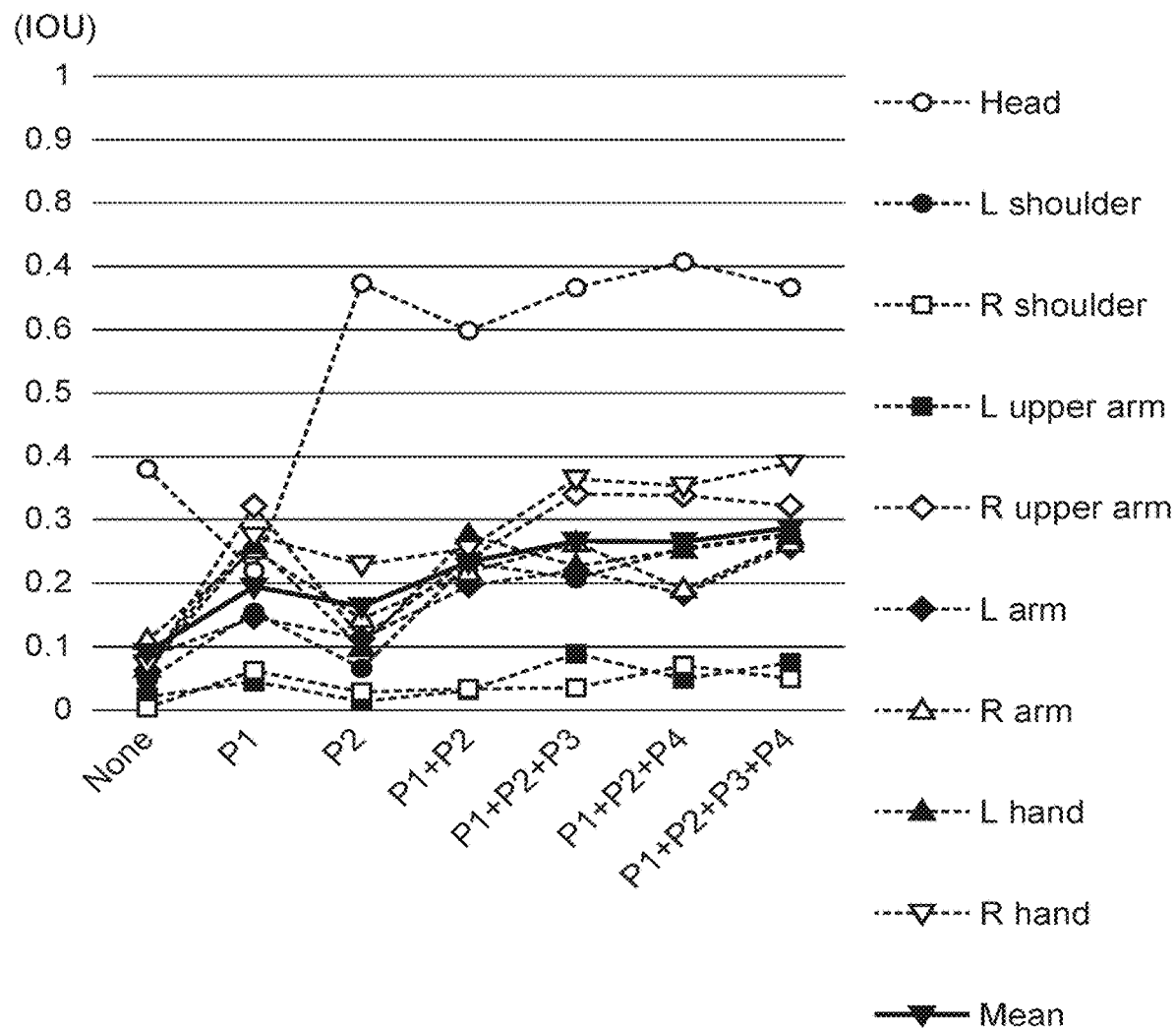
FIG. 16 is a drawing for describing effects of the training system according to the first embodiment.

FIG. 15 illustrates the recognition accuracy when an image of a person performing the assembly work of a component is input to the first model. FIG. 16 illustrates the recognition accuracy when an image of a person performing inspection work is input to the first model. Both images are depth images obtained by imaging the persons from above. In FIGS. 15 and 16, the vertical axis is Intersection over Union (IOU). The horizontal axis is the processing used when generating the second image. One or more of the first processing P1, the second processing P2, the third processing P3, or the fourth processing P4 is used. "None" illustrates the result when the first image is used to train the first model without performing these processing.

FIGS. 15 and 16 illustrate the recognition accuracy of each body part and the average (Mean) of the recognition accuracies. From the results of FIGS. 15 and 16, it can be seen that the average value of the recognition accuracies is improved by performing at least one of the first to fourth processing. In particular, it can be seen that the average value of the recognition accuracies is greatly improved by performing two or more of the first to fourth processing.

As described above, the fifth processing synthesizes an image of real space with the periphery of the human body model included in the first image. Thereby, fluctuation of pixels and missing pixels are added to the periphery of the human body model. Accordingly, it is considered that effects similar to those of the second and third processing are obtained by performing the fifth processing. Also, effects similar to those of the fourth processing can be expected when an article is included in the image of real space. Therefore, it is favorable for the third generator 13 to generate the second image by performing two or more of the first to fifth processing.

In the example described above, the first model is trained by mainly using a depth image. The training is not limited to the example; the first model may be trained using a color image. However, to improve the recognition accuracy of the body parts of the person, it is favorable to use a depth image. When a color image is used, the colors of the clothing, the skin, the hair, etc., of the person affect the recognition results. Therefore, the recognition accuracy decreases if the colorization of the human body model used when training is different from the colors of the person that is imaged. In a first image that includes color information, it is necessary to set the value of the color for each pixel. Also, it is necessary to set the colors to resemble those of an actual person. Conversely, a first image that includes depth information can be easily generated by setting the distance between a reference plane and parts of the human body model as the pixel value.

In the example described above, an image is used in which the human body model or the person is imaged from above. The image is not limited to the example; an image may be used in which the human body model or the person is imaged from the front, the back, or the side. However, in an actual work site, articles such as equipment, fixtures, etc., may exist at the periphery of the person. Therefore, when a person in real space is imaged from the front, the back, or the side, there is a possibility that a portion of the person may be undesirably hidden by an article. By imaging the person from above, the likelihood of the person being hidden by an article can be reduced. Therefore, it is desirable to use an image in which the human body model or the person is imaged from above. When imaging a person in real space, the position of the imaging device may not be directly above the person. For example, it is sufficient for the tilt from the vertical direction of a line segment connecting the imaging device and the head of the person to be 45 degrees or less.

Although the first image may be generated based on only a human body model, more favorably, an environment model is also used. The body parts of the person and the regions other than the body parts are easily identified by using an environment model modeling an environment in real space to generate the first image and by using a second image based on the first image for the training. The recognition accuracy of the body parts by the first model can be further increased thereby.

First Modification

Figure 17:
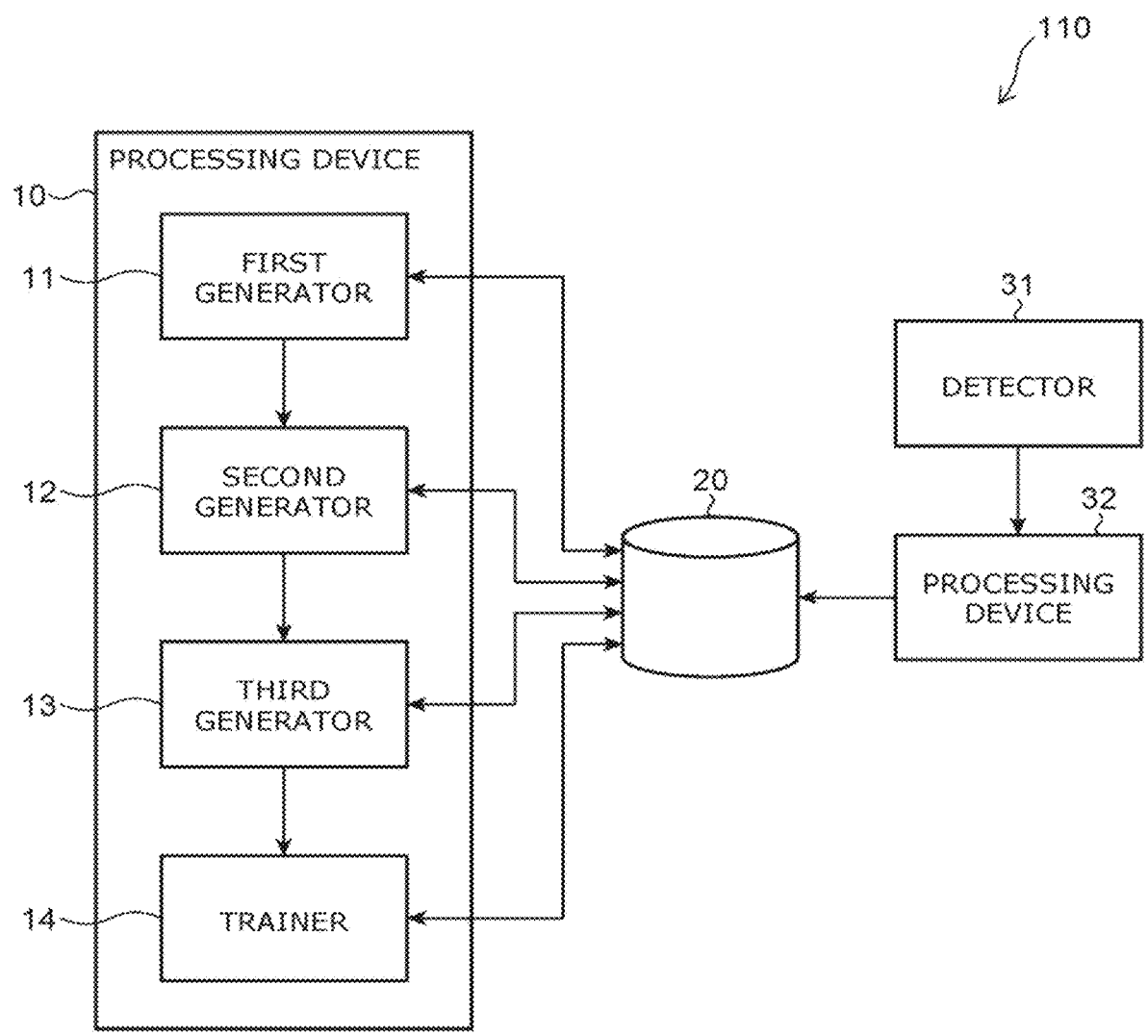
FIG. 17 is a schematic block diagram showing a configuration of a training system according to a first modification of the first embodiment.

FIG. 17 is a schematic block diagram showing a configuration of a training system according to a first modification of the first embodiment.

As illustrated in FIG. 17, the training system 110 according to the first modification further includes a detector 31 and a processing device 32. The detector 31 is mounted to a person in real space and detects the movement of the person. The processing device 32 calculates positions of each body part at multiple times based on the detected movement and stores the calculation result in the memory device 20.

For example, the detector 31 includes at least one of an acceleration sensor or an angular velocity sensor. The detector 31 detects the acceleration or the angular velocity of body parts of the person. The processing device 32 calculates the positions of the body parts based on the detection results of the acceleration or the angular velocity.

The number of the detectors 31 is selected as appropriate according to the number of body parts to be discriminated. For example, ten detectors 31 are used when annotating the head, two shoulders, two upper arms, two forearms, and two hands of a person imaged from above as illustrated in FIGS. 10A to 14B. The ten detectors are mounted to portions of the body parts of the person in real space where the ten detectors can be stably mounted. For example, the detectors are mounted where the change of the shape is relatively small such as at the back of the hand, the middle portion of the forearm, the middle portion of the upper arm, the shoulder, the back of the neck, and the back of the neck and the periphery of the head; and the position data of these parts is acquired.

The first generator 11 refers to the position data of the body parts stored in the memory device 20 and causes the human body model to have the same pose as the person in real space. The first generator 11 uses the human body model of which the pose is set to generate the first image. For example, the person mounting the detectors 31 has the same pose as the actual work. Thereby, the pose of the human body model in the first image approaches the pose in the actual work.

According to this method, it is unnecessary for a human to designate the positions of the body parts of the human body model. Also, the pose of the human body model can be prevented from being completely different from the pose of the person in the actual work. Because the pose of the human body model approaches the pose in the actual work, the accuracy of annotating the body parts by the first model can be increased.

Second Modification

The processing when the second generator 12 generates the teacher image in a training system according to a second modification is different from that of the training system 100. The second generator 12 uses the centroid as the annotation when annotating the body parts of the human body model in the first image. In such a case, the second generator 12 calculates the centroid positions in three-dimensional space of the body parts of the human body model.

Figure 18A:
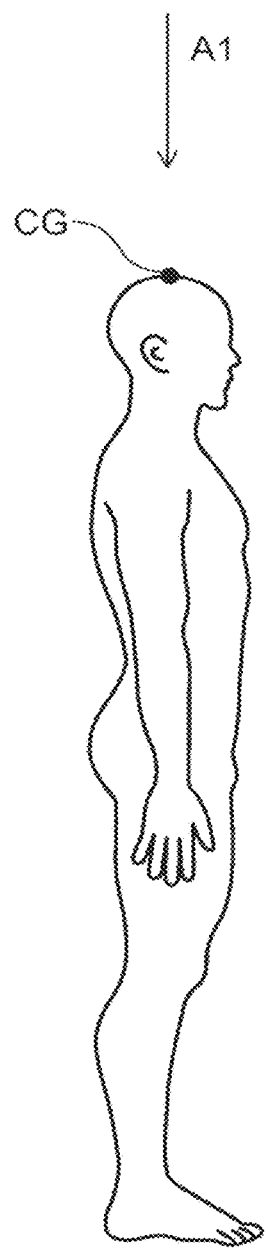
FIGS. 18A to 18C are drawings for describing the processing according to the training system according to the second modification of the first embodiment.
Figure 18B:
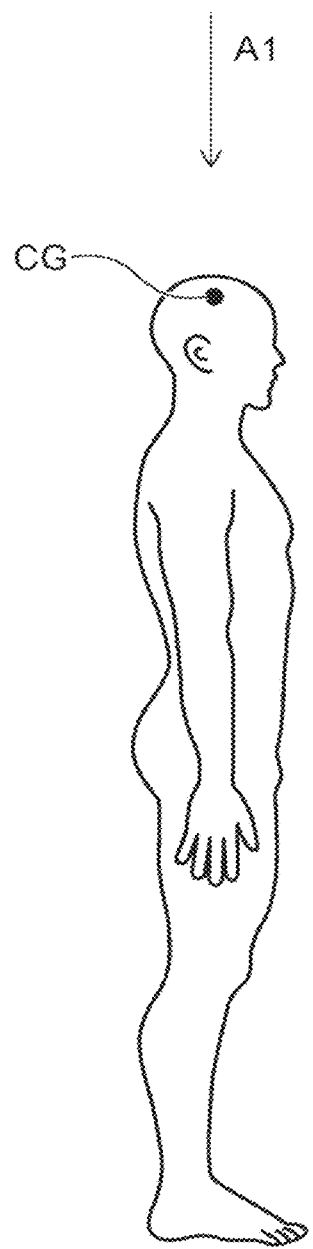
Figure 18C:
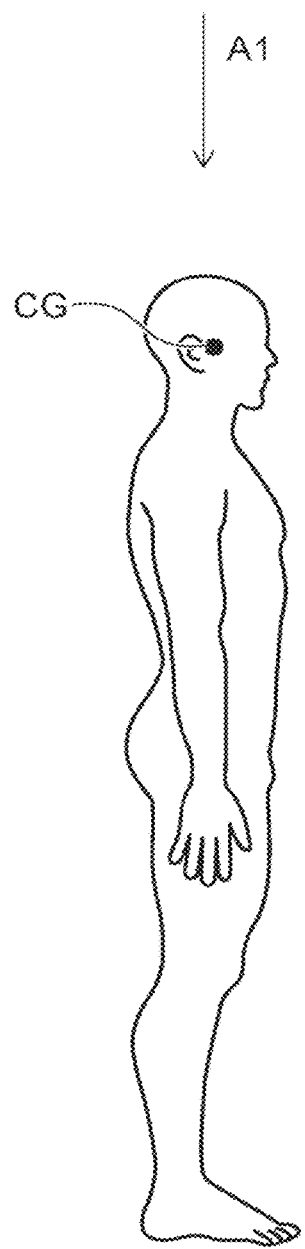

FIGS. 18A to 18C are drawings for describing the processing according to the training system according to the second modification of the first embodiment.

There is a method for calculating the centroid of some region in a depth image in which the centroid is calculated in the width and height directions of the region. In this method, the depth information of the pixels is not used to calculate the centroid. For example, when viewed along arrow A1 as illustrated in FIG. 18A, the depth image in which the human body model 91 is imaged is generated, and the centroid of the head of the human body model in the depth image is calculated. If the depth information is not used to calculate the centroid, a three-dimensional centroid CG is positioned at the surface of the head.

There is also another method in which the depth information of the pixels is used when calculating the centroid of some region in the depth image. However, only the human body is imaged in the depth image when viewed from one direction. For example, in the depth image of the human body model 91 when viewed along arrow A1, the top surface of the head is imaged, but the back of the head, the lower side of the temporal region, below the chin, etc., are not imaged. Therefore, as illustrated in FIG. 18B, the depth of the centroid is shallower than the actual three-dimensional depth.

Conversely, when the human body model is used to calculate the three-dimensional centroid, the position of the true centroid can be calculated regardless of the appearance of the human body model in the image, etc. For example, the centroid of the head illustrated in FIG. 18C is positioned deeper than the centroids illustrated in FIGS. 18A and 18B.

By showing the three-dimensional centroids of the body parts for the human body model imaged in the first image, the true coordinates and depth of the body part can be shown regardless of the appearance of the body part in the image. By training the first model with a teacher image that shows the three-dimensional centroids, the effects of the appearance in the image of the person in real space on the annotation of the body parts can be reduced. Accordingly, the accuracy of annotating the body parts can be increased.

Third Modification

Figure 19:
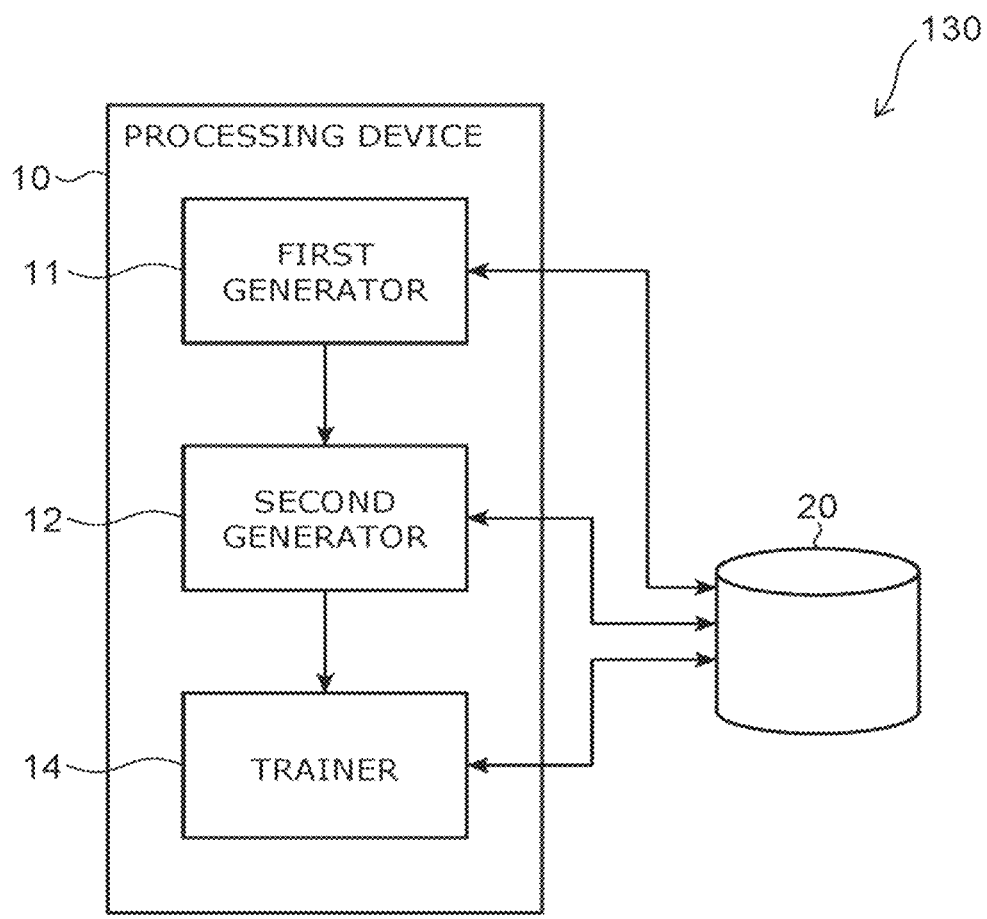
FIG. 19 is a schematic block diagram showing a configuration of a training system according to a third modification of the first embodiment.

FIG. 19 is a schematic block diagram showing a configuration of a training system according to a third modification of the first embodiment.

As illustrated in FIG. 19, the training system 130 according to the third modification does not include the third generator 13.

In the training system 130, the first generator 11 generates a first image in which the human body model is partially cut off. Specifically, the first generator 11 renders only a portion of the human body model when generating a first image in which the human body model is imaged when viewed along a prescribed direction. For example, the region to be rendered is set in a rectangular configuration. For example, when the human body model is partially cut off at one side of the first image, the boundary between the portion of the human body model to be rendered and the portion not to be rendered is a straight line. The human body model may be partially cut off at a corner of the first image.

Figure 20A:
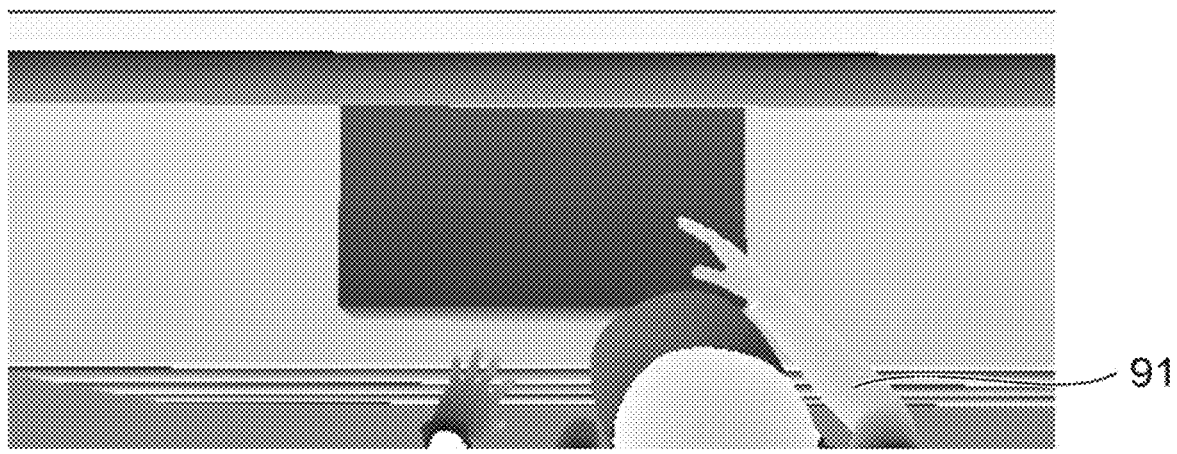
FIGS. 20A to 20C are drawings for describing processing according to an analysis system according to the third modification of the first embodiment.
Figure 20B:
Figure 20C:
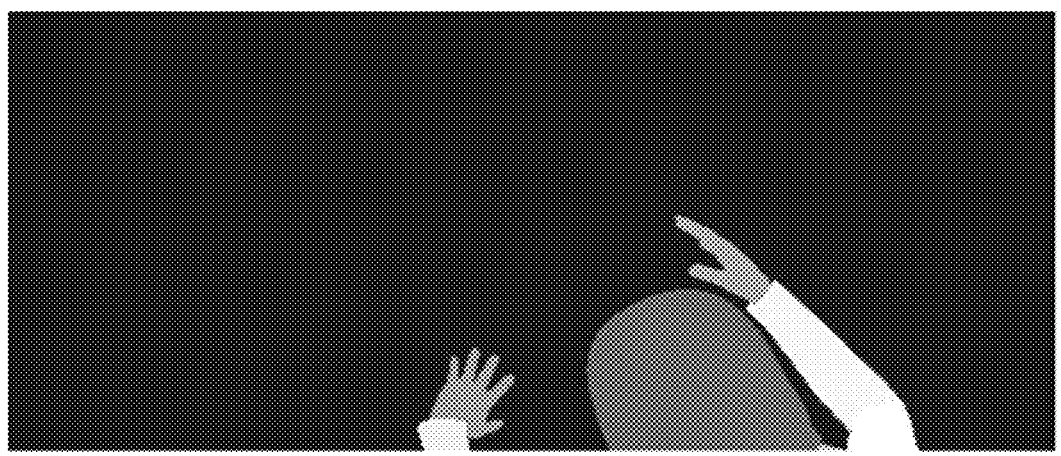

FIGS. 20A to 20C are drawings for describing processing according to an analysis system according to the third modification of the first embodiment.

FIGS. 20A and 20B illustrate the first image generated by the first generator 11 by using the human body model. FIG. 20A illustrates a depth image. FIG. 20B illustrates a color image. In these images, the human body model 91 is partially cut off at the lower side. As illustrated in FIG. 20C, the second generator 12 generates the teacher image corresponding to the first image of FIG. 20A or FIG. 20B.

When imaging a person in real space, there are cases where the person is partially cut off in the image that is acquired. In such a case as well, it is desirable to recognize the body parts in the image with high accuracy. By training the first model with the first image in which the human body model is partially cut off, the recognition accuracy of the body parts imaged in the image can be increased even when the image in which the person is partially cut off is input to the first model.

Or, instead of generating the first image in which the person is partially cut off, the first processing of the first image generated in the training system 100 may be performed so that the person is partially cut off. Similar effects can be obtained by using the generated second image to train the first model.

Second Embodiment

Figure 21:
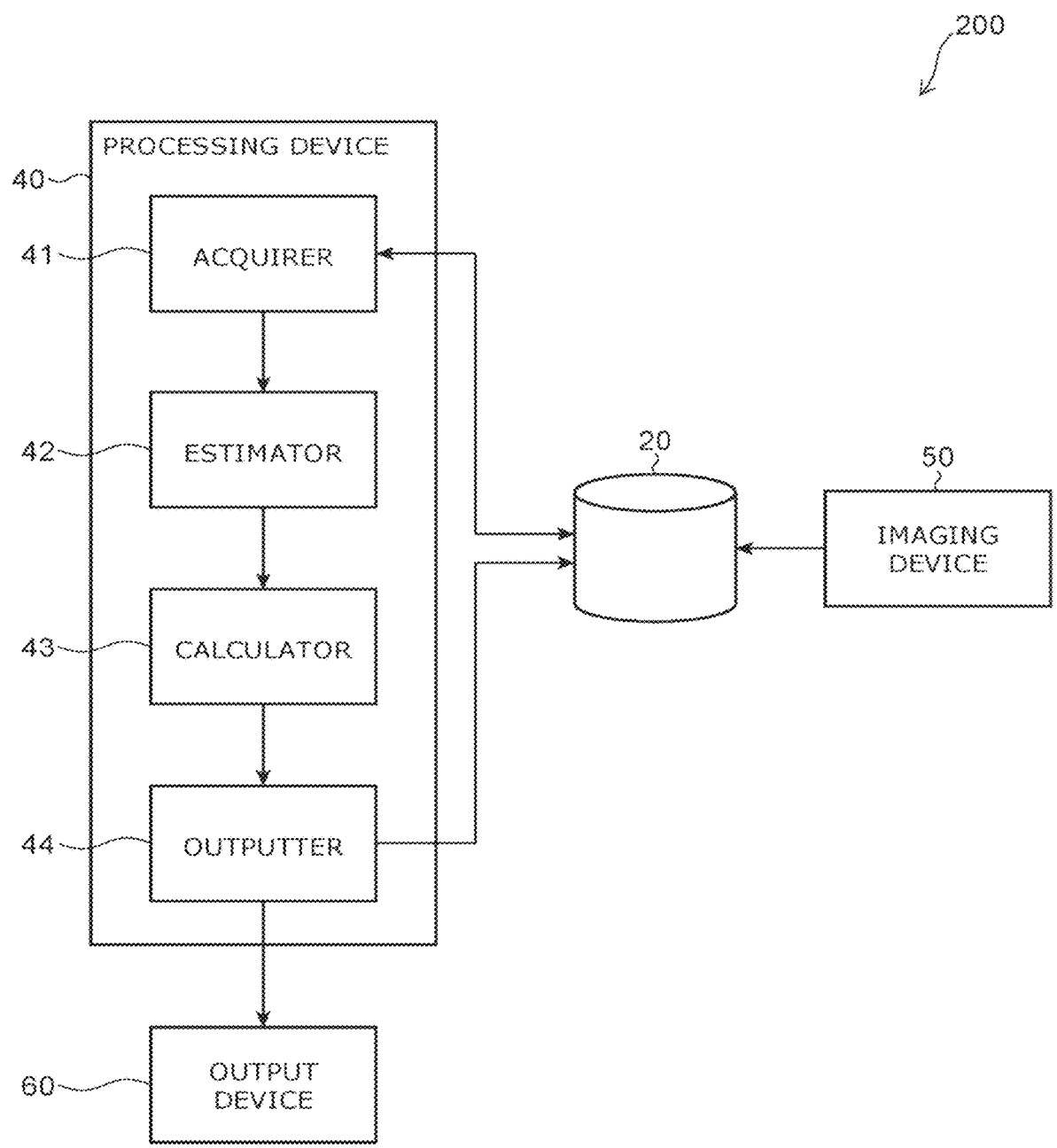
FIG. 21 is a schematic block diagram illustrating a configuration of an analysis system according to a second embodiment.

FIG. 21 is a schematic block diagram illustrating a configuration of an analysis system according to a second embodiment.

FIGS. 22A to 25B are figures for describing the processing according to the analysis system according to the second embodiment.

The analysis system 200 according to the second embodiment performs an analysis by using the first model trained by the training system according to the first embodiment. As illustrated in FIG. 21, the analysis system 200 includes a processing device 40. In the example of FIG. 21, the analysis system 200 further includes the memory device 20, the imaging device 50, and an output device 60.

The imaging device 50 generates an image by imaging a person (a first person) working in real space. Hereinafter, the person that is working and is imaged by the imaging device 50 also is called a worker. The imaging device 50 may acquire a still image or a video image. When acquiring a video image, the imaging device 50 cuts out still images from the video image. The imaging device 50 stores the images of the worker in the memory device 20.

For example, the worker repeatedly performs a prescribed first work. The imaging device 50 repeatedly images the worker between the start and the end of the first work performed one time. The imaging device 50 stores the multiple images obtained by the repeated imaging in the memory device 20.

The processing device 40 includes an acquirer 41, an estimator 42, a calculator 43, and an outputter 44.

The acquirer 41 accesses the memory device 20 and inputs, to the first model, an image (the input image) in which the worker is imaged. The first model outputs an image (the output image) in which the body parts of the worker are annotated. The acquirer 41 acquires an image output from the first model.

Based on the image acquired by the acquirer 41, the estimator 42 estimates skeleton information of the worker imaged in the input image. The skeleton information includes positions of the skeleton. For example, the positions of the joints are estimated as the positions of the skeleton. The joints are set to the boundary portions between the body parts. The positions of other joints may be estimated based on the positions of the multiple joints. Instead of the joints, the centroids of the body parts may be used as the skeleton. Or, a combination of the joints and the centroids may be used as the skeleton.

Figure 22A:
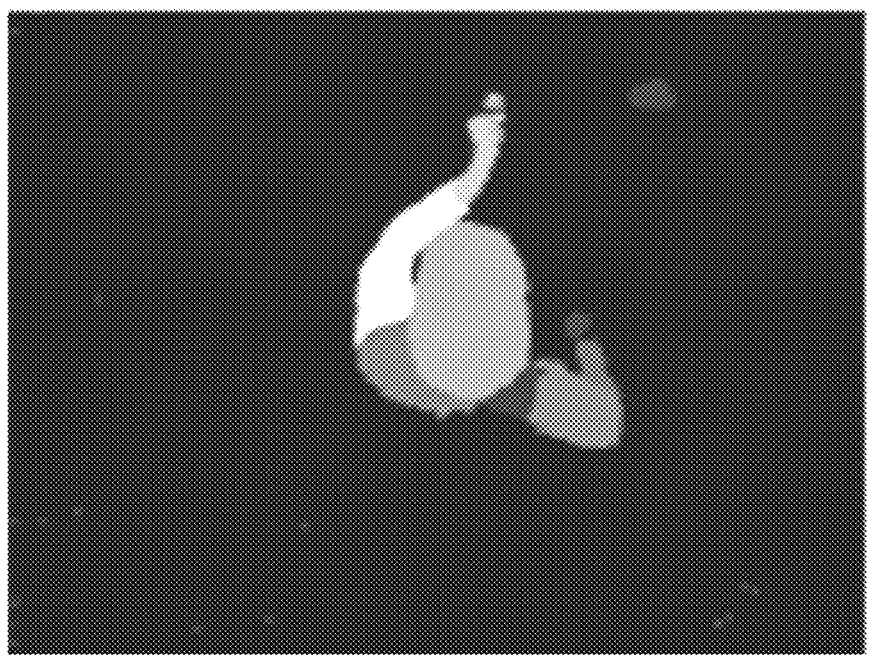
FIGS. 22A and 22B are figures for describing the processing according to the analysis system according to the second embodiment.
Figure 22B:
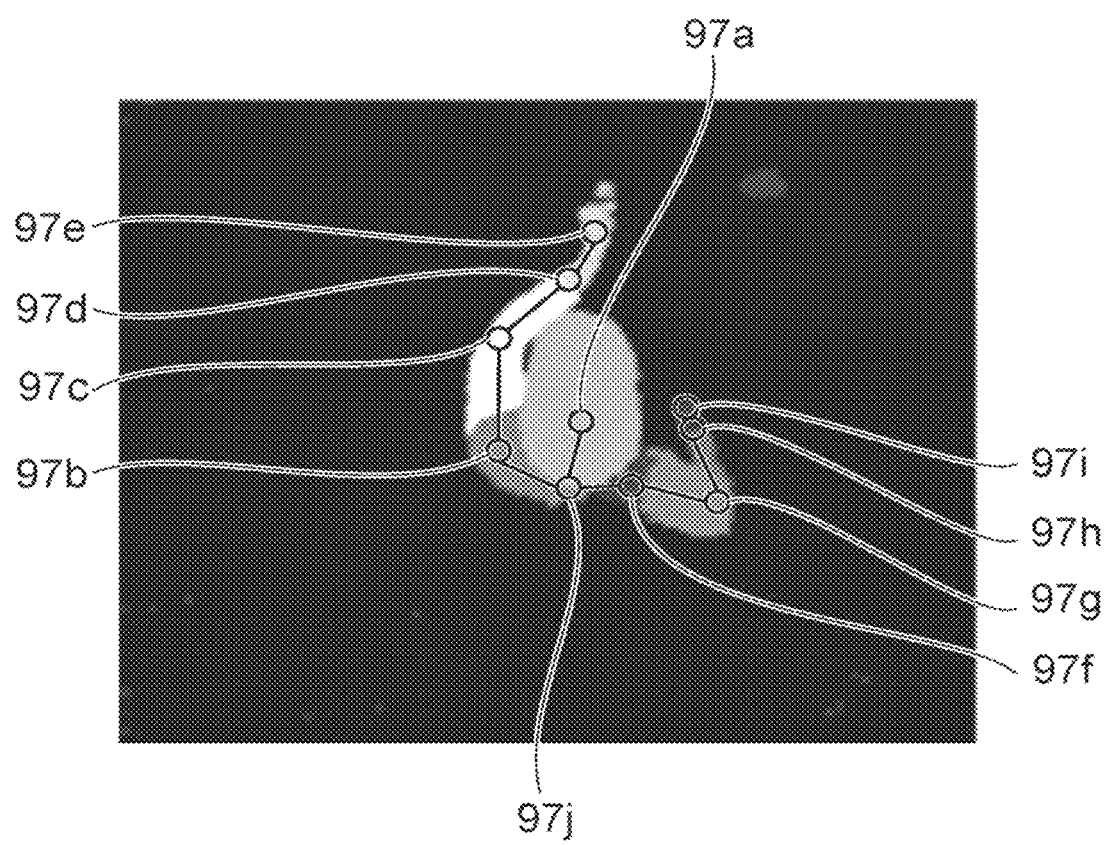

As an example, the acquirer 41 acquires the image illustrated in FIG. 22A by inputting the image to the trained first model. As illustrated in FIG. 22B, the estimator 42 extracts the skeleton information from the image illustrated in FIG. 22A. In the example, a centroid 97*a* of the head, a centroid 97*b* of the left shoulder, a left elbow 97*c*, a left wrist 97*d*, a centroid 97*e* of the left hand, a centroid 97*f* of the right shoulder, a right elbow 97*g*, a right wrist 97*h*, the centroid 97*i* of the right hand, a spine 97*j*, and the bones connecting these elements are estimated. Other than the centroids, the coordinates of the connecting portions (the joints) of the body parts may be used as the skeleton information.

The estimator 42 estimates multiple skeleton information from multiple images annotated by the first model. Thereby, the skeleton information of the worker when performing the first work is obtained at multiple times.

The calculator 43 uses the multiple skeleton information to generate time-series data of the movement of the body parts over time. For example, the calculator 43 extracts the position of the centroid of the head from the multiple skeleton information. The calculator 43 organizes the position of the centroid of the head according to the time of acquiring the image that is the basis of the skeleton information. For example, the time-series data of the movement of the head over time is obtained by generating data in which the time and the position are associated and used as one record, and by sorting the multiple data in order of time. The calculator 43 generates the time-series data for at least one skeleton.

The estimator 42 may not be provided when the joints or the centroids are identified by the first model as the annotation of each body part. The calculator 43 may generate the time-series data by using the positions of the joints or the centroids annotated by the first model.

The calculator 43 estimates the period of the first work based on the generated time-series data. For example, the calculator 43 extracts mutually-similar characteristic points from the time-series data. The calculator 43 uses the time between points next to each other along the time axis as the period of the first work.

The outputter 44 outputs information based on the calculated period to the outside. For example, the information that is output includes the calculated period. Or, the information may include a value obtained by a calculation using the period. In addition to the period, the outputter 44 also may output the time-series data of the skeleton, the times of the images used to calculate the period, etc. For example, the outputter 44 outputs the information to the output device 60. The output device 60 includes at least one of a monitor, a speaker, a printer, or a projector. The outputter 44 may store the information in the memory device 20. Or, the outputter 44 may output a file including the information in a prescribed format such as CSV, etc. The outputter 44 may transmit the data to an external server by using FTP (File Transfer Protocol), etc. Or, the outputter 44 may insert the data into an external database server by performing database communication and using ODBC (Open Database Connectivity), etc.

In FIGS. 23A, 23B, 24B, and 24C, the horizontal axis is the time, and the vertical axis is the position in the vertical direction (the depth).

In FIGS. 23C, 23D, 24D, and 25A, the horizontal axis is the time, and the vertical axis is the distance. In these figures, a larger distance value indicates that the distance is short between two objects, and the correlation is strong.

Figure 24A:
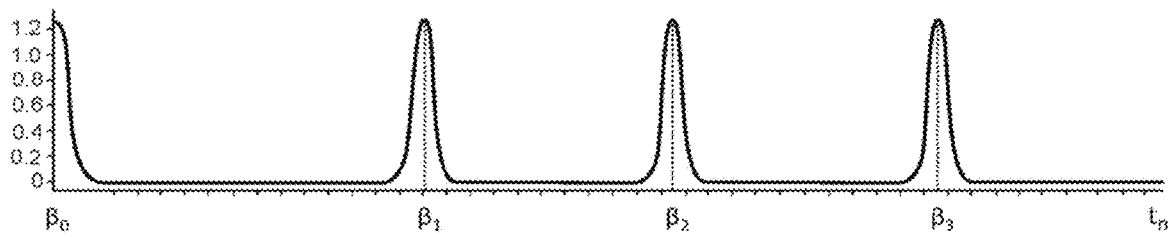
FIGS. 24A to 24D are figures for describing the processing according to the analysis system according to the second embodiment.
Figure 25A:
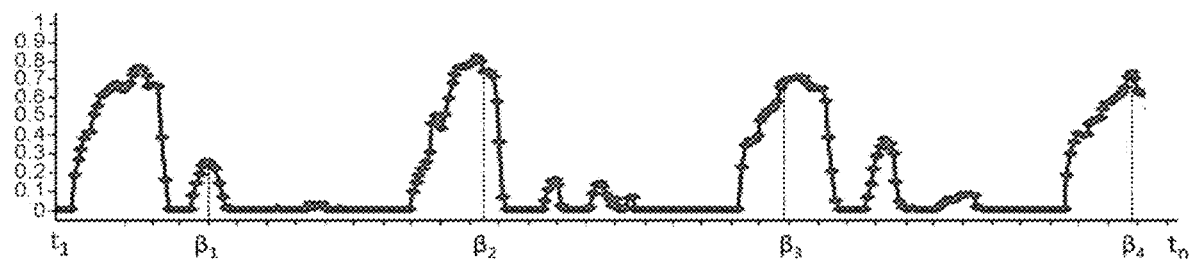
FIGS. 25A and 25B are figures for describing the processing according to the analysis system according to the second embodiment.
Figure 25B:
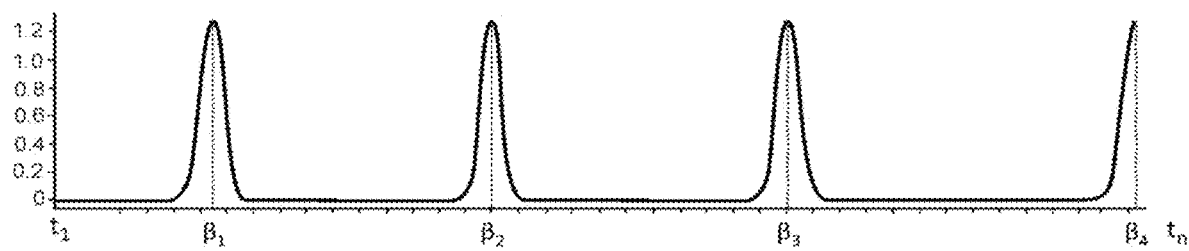

In FIGS. 24A and 25B, the horizontal axis is time, and the vertical axis is a scalar value.

Figure 23A:
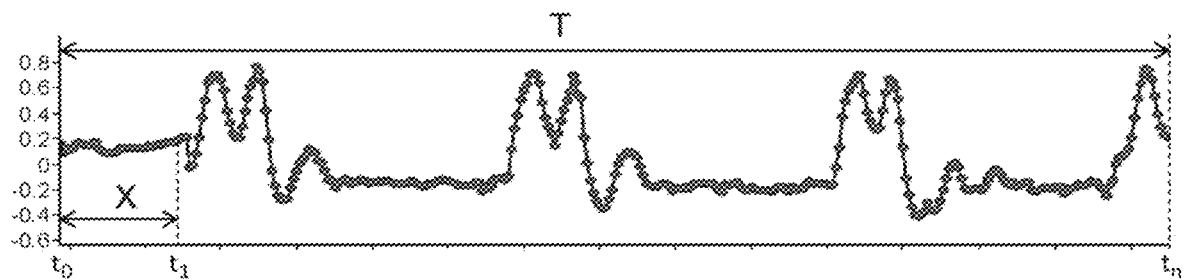
FIGS. 23A to 23D are figures for describing the processing according to the analysis system according to the second embodiment.

FIG. 23A is an example of time-series data generated by the calculator 43. For example, FIG. 23A is the time-series data of a time length T showing the movement of the left hand of the worker. First, the calculator 43 extracts partial data of a time length X from the time-series data illustrated in FIG. 23A.

For example, the time length X is preset by the worker, the administrator of the analysis system 200, etc. A value that roughly corresponds to the period of the first work is set as the time length X. The time length T may be preset or may be determined based on the time length X. For example, the acquirer 41 inputs, to the first model, the multiple images imaged during the time length T. The estimator 42 estimates the skeleton information from the output results. The calculator 43 uses the estimation results to generate the time-series data of the time length T.

Figure 23B:
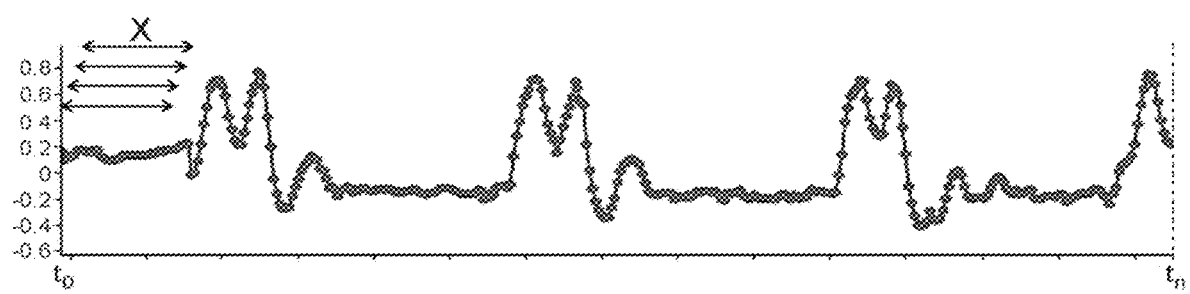

Separately from the partial data, the calculator 43 extracts the data of the time length X at a prescribed time interval within a time $t_0$ to a time $t_n$ in the time-series data of the time length T. Specifically, as illustrated by the arrows of FIG. 23B, for example, the calculator 43 extracts the data of the time length X from the time-series data for each frame over the entirety from the time to to the time $t_n$. In FIG. 23B, the durations are illustrated by arrows for only a portion of the extracted data. Hereinafter, the information that is extracted by the step illustrated in FIG. 23B is called first comparison data.

Figure 23C:
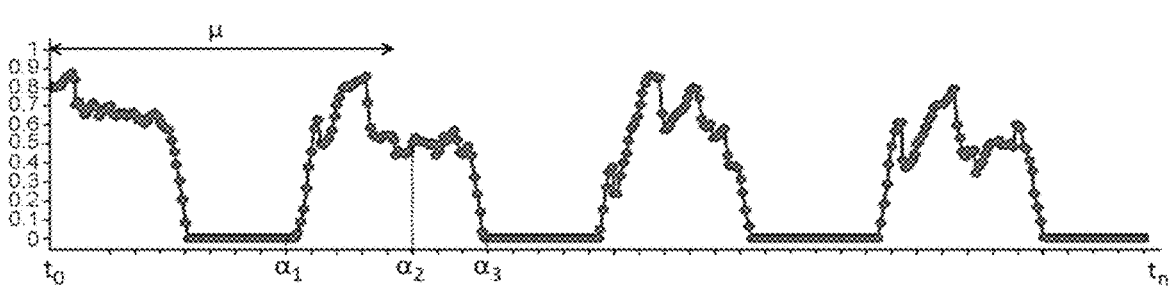

The calculator 43 sequentially calculates the distances between the partial data extracted in the step illustrated in FIG. 23A and each of the first comparison data extracted in the step illustrated in FIG. 23B. For example, the calculator 43 calculates the DTW (Dynamic Time Warping) distance between the partial data and the first comparison data. By using the DTW distance, the strength of the correlation can be determined regardless of the length of the time of the repeated movement. As a result, the information of the distance of the time-series data for the partial data is obtained at each time. These are illustrated in FIG. 23C. Hereinafter, the information that includes the distance at multiple times illustrated in FIG. 23C is called first correlation data.

Then, the calculator 43 sets temporary similarity points in the time-series data to estimate the period of the work time of a worker M. Specifically, in the first correlation data illustrated in FIG. 23C, the calculator 43 randomly sets multiple candidate points $\alpha_1$ to $\alpha_m$ within the range of a fluctuation time N referenced to a time after a time $\mu$ has elapsed from the time $t_0$. In the example illustrated in FIG. 23C, three candidate points are randomly set. For example, the time $\mu$ and the fluctuation time N are preset by the worker, the administrator, etc.

The calculator 43 generates data of normal distributions having peaks at the candidate points $\alpha_1$ to $\alpha_m$ that are randomly set. Then, a cross-correlation coefficient (a second cross-correlation coefficient) with the first correlation data illustrated in FIG. 23C is determined for each normal distribution. The calculator 43 sets the temporary similarity point to be the candidate point with the highest cross-correlation coefficient. For example, the temporary similarity point is set to the candidate point $\alpha_2$ illustrated in FIG. 23C.

Figure 23D:
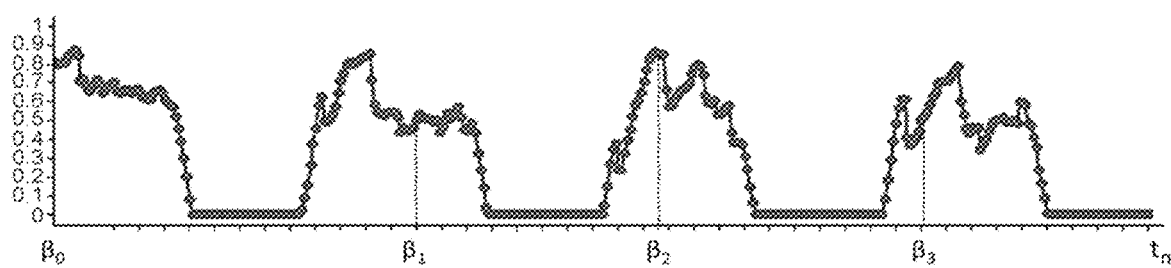

Based on the temporary similarity point (the candidate point $\alpha_2$), the calculator 43 again randomly sets the multiple candidate points $\alpha_1$ to $\alpha_m$ within the range of the fluctuation time N referenced to a time after the time $\mu$ has elapsed. Multiple temporary similarity points $\beta_1$ to $\beta_k$ are set between the time $t_0$ to the time $t_n$ as illustrated in FIG. 23D by repeatedly performing this step until the time $t_n$. As illustrated in FIG. 24A, the calculator 43 generates data that includes multiple normal distributions having peaks at the temporary similarity points $\beta_1$ to $\beta_k$. Hereinafter, the information that includes the multiple normal distributions illustrated in FIG. 24A is called second comparison data. The calculator 43 calculates a cross-correlation coefficient (a first cross-correlation coefficient) between the first correlation data illustrated in FIGS. 23C and 23D and the second comparison data illustrated in FIG. 24A.

The calculator 43 performs steps similar to those of FIGS. 23A to 24A for other partial data as illustrated in FIGS. 24B to 24D, 25A, and 25B. Only the information at and after a time $t_1$ is illustrated in FIGS. 24B to 25B.

Figure 24B:
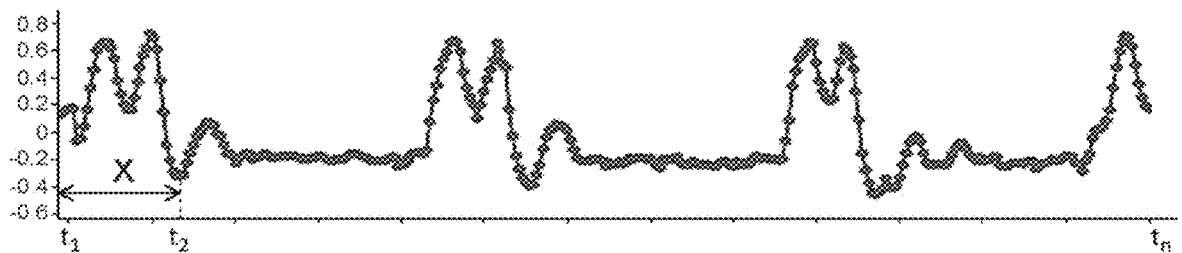
Figure 24C:
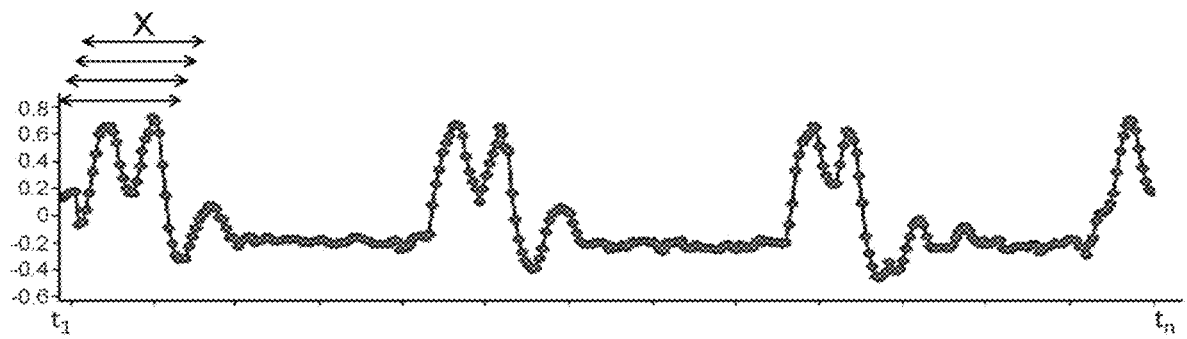

For example, as illustrated in FIG. 24B, the calculator 43 extracts the partial data of the time length X between the time $t_1$ and a time $t_2$. Continuing, the calculator 43 extracts multiple first comparison data of the time length X as illustrated in FIG. 24C. The calculator 43 generates the first correlation data as illustrated in FIG. 24D by calculating the distances between the partial data and the multiple first comparison data.

Figure 24D:
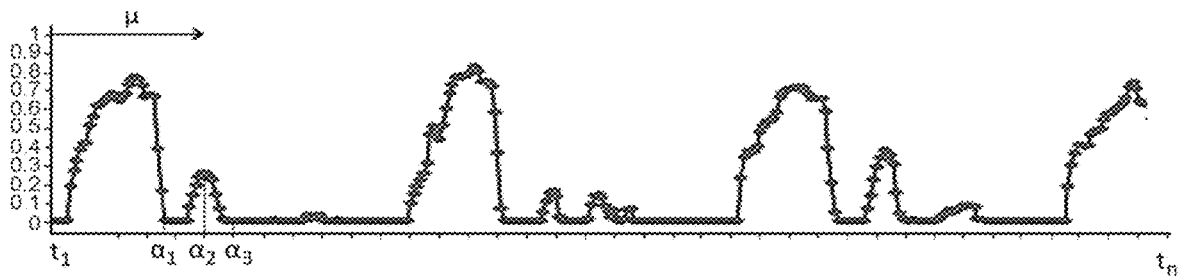

As illustrated in FIG. 24D, the calculator 43 extracts a temporary similarity point β by randomly setting the multiple candidate points $\alpha_1$ to $\alpha_m$ referenced to a time after the time μ has elapsed from the time $t_0$. By repeating this extraction, the multiple temporary similarity points $\beta_1$ to $\beta_k$ are set as illustrated in FIG. 25A. Then, as illustrated in FIG. 25B, the calculator 43 generates the second comparison data based on the temporary similarity points $\beta_1$ to $\beta_k$ and calculates the cross-correlation coefficient between the first correlation data illustrated in FIGS. 24D and 25A and the second comparison data illustrated in FIG. 25B.

The calculator 43 also calculates the cross-correlation coefficient for the partial data at and after the time $t_2$ by repeating the steps described above. Subsequently, the calculator 43 extracts, as the true similarity points, the temporary similarity points $\beta_1$ to $\beta_k$ for which the highest cross-correlation coefficient is obtained. The calculator 43 obtains the period of the first work of the worker by calculating the time interval between the true similarity points. For example, the calculator 43 can determine the average time between the true similarity points next to each other along the time axis and use the average time as the period of the first work.

Here, an example is described in which the period of the first work of the worker is analyzed by the analysis system 200 according to the second embodiment. The applications of the analysis system 200 according to the second embodiment are not limited to the example. For example, the analysis system 200 can be widely applied to the analysis of the period of a person that repeatedly performs a prescribed movement.

Figure 26:
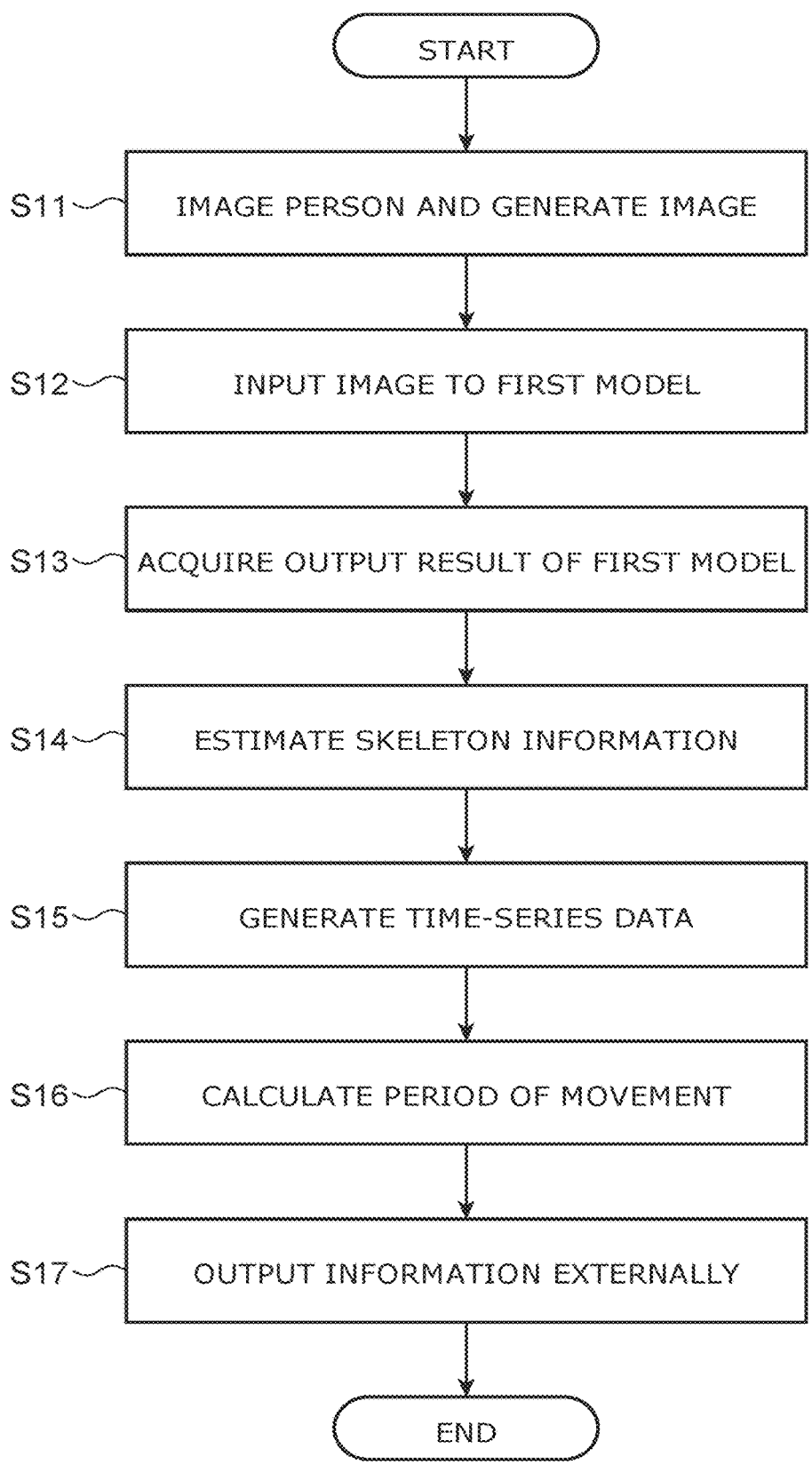
FIG. 26 is a flowchart illustrating the processing according to the analysis system according to the second embodiment.

FIG. 26 is a flowchart illustrating the processing according to the analysis system according to the second embodiment.

The imaging device 50 generates an image by imaging a person (step S11). The acquirer 41 inputs the image to the first model (step S12) and acquires the output result of the first model (step S13). The estimator 42 estimates skeleton information of the person from the output result (step S14). The calculator 43 uses the skeleton information to generate time-series data relating to the body parts (step S15). The calculator 43 calculates the period of the movement of the person based on the time-series data (step S16). The outputter 44 outputs information based on the calculated period to the outside (step S17).

According to the analysis system 200, the period of a prescribed movement that is repeatedly performed can be automatically analyzed. For example, the period of a first work of a worker in a manufacturing site can be automatically analyzed. Therefore, recording and/or reporting performed by the worker, observation work and/or period measurement by an engineer for work improvement, etc., are unnecessary. The period of the work can be easily analyzed. Also, the period can be determined with higher accuracy because the analysis result is independent of the experience, the knowledge, the judgment, etc., of the person performing the analysis.

When analyzing, the analysis system 200 uses the first model trained by the training system according to the first embodiment. According to the first model, the body parts of the person that is imaged can be annotated with higher accuracy. Accordingly, by using the first model when analyzing, more accurate skeleton information can be obtained.

The accuracy of the period can be increased by calculating the period based on the skeleton information.

Figure 27:
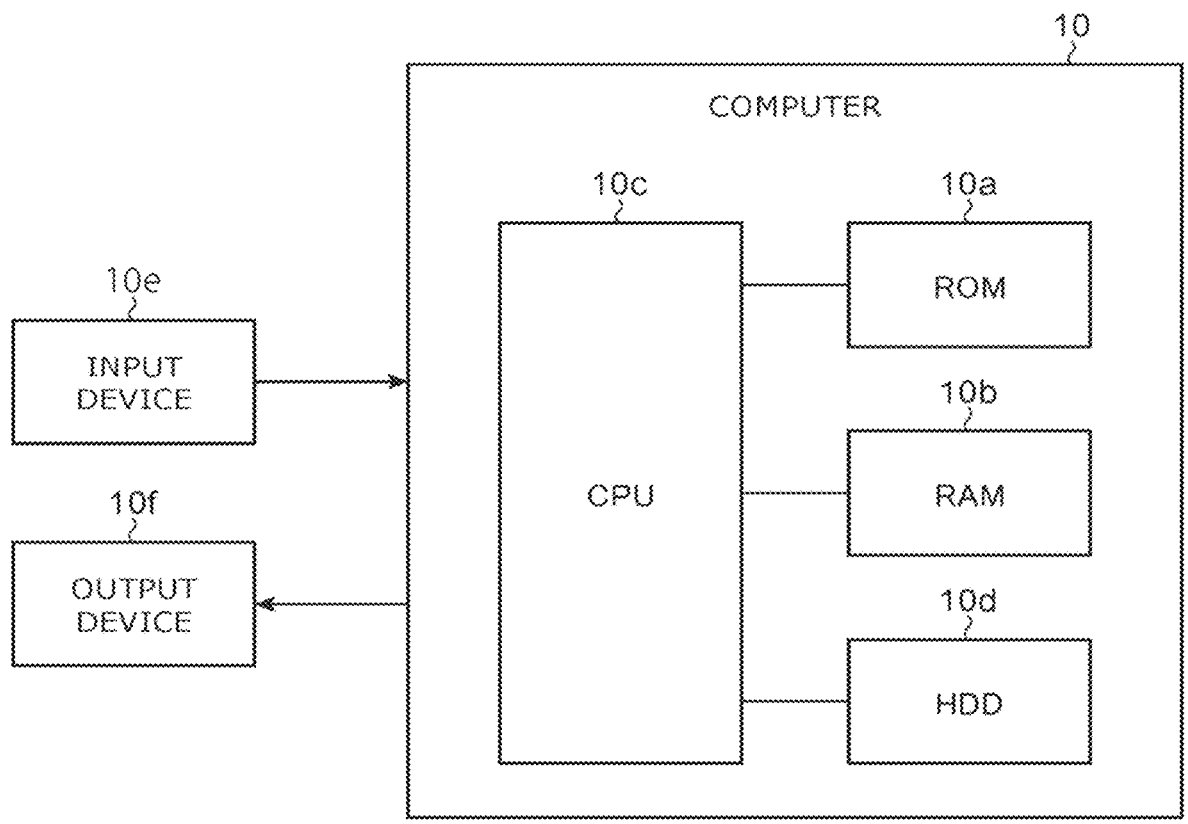
FIG. 27 is a block diagram illustrating a hardware configuration of the system.

FIG. 27 is a block diagram illustrating a hardware configuration of the system.

For example, the processing device 10 of the training system 100 according to the first embodiment is a computer and includes ROM (Read Only Memory) 10a, RAM (Random Access Memory) 10b, a CPU (Central Processing Unit) 10c, and a HDD (Hard Disk Drive) 10d. The ROM 10a stores programs controlling the operations of the computer. The ROM 10a stores programs necessary for causing the computer to function as the first generator 11, the second generator 12, the third generator 13, the trainer 14, etc., described above.

The RAM 10b functions as a memory region where the programs stored in the ROM 10a are loaded. The CPU 10c includes a processing circuit. The CPU 10c reads a control program stored in the ROM 10a and controls the operation of the computer according to the control program. The CPU 10c loads various data obtained by the operation of the computer into the RAM 10b. The HDD 10d stores information necessary for reading and information obtained in the reading process. For example, the HDD 10d functions as the memory device 20 illustrated in FIG. 1.

Instead of the HDD 10d, the processing device 10 may include an eMMC (embedded Multi Media Card), a SSD (Solid State Drive), a SSHD (Solid State Hybrid Drive), etc.

An input device 10e and an output device 10f may be connected to the processing device 10. The user uses the input device 10e to input information to the processing device 10. The input device 10e includes at least one of a mouse, a keyboard, a microphone (audio input), or a touchpad. Information that is transmitted from the processing device 10 is output to the output device 10f. The output device 10f includes at least one of a monitor, a speaker, a printer, or a projector. A device such as a touch panel that functions as both the input device 10e and the output device 10f may be used.

A hardware configuration similar to FIG. 27 is applicable also to the processing device 32 of the training system 110 and the processing device 40 of the analysis system 200. Or, one computer may function as the processing devices 10 and 32 in the training system 110. One computer may function as the processing devices 10 and 40 in the analysis system 200. One computer may function as the processing devices 10, 32, and 40 when implementing the training system and the analysis system in combination. Or, the processing and the functions of the processing devices 10, 32, and 40 may be realized by collaboration between more computers.

By using the training system and the training method according to the embodiments described above, the labor necessary to prepare the teaching data can be reduced, and the accuracy of the annotation by the first model can be increased. Similar effects can be obtained by using a program for causing a computer (a processing device) to operate as the training system.

By using the analysis system and the analysis method according to the embodiments described above, the period of the movement of the person can be determined with higher accuracy. Similar effects can be obtained by using a program for causing a computer (a processing device) to operate as the analysis system.

The processing of the various data described above may be recorded in a magnetic disk (a flexible disk, a hard disk, etc.), an optical disk (CD-ROM, CD-R, CD-RW, DVD- ROM, DVD±R, DVD±RW, etc.), semiconductor memory, or another recording medium as a program that can be executed by a computer.

For example, the information that is recorded in the recording medium can be read by a computer (or an embedded system). The recording format (the storage format) of the recording medium is arbitrary. For example, the computer reads the program from the recording medium and causes a CPU to execute the instructions recited in the program based on the program. The acquisition (or the reading) of the program by the computer may be performed via a network.

The embodiments include the following features.

Feature 1

A training system, comprising:

a first generator using a human body model to generate a first image, the human body model modeling a human body and being three-dimensional and virtual;

a second generator generating a teacher image by annotating body parts of the human body model in the first image;

a third generator generating a second image including noise by performing, on the first image, at least one selected from first processing of deleting a pixel along an edge of the first image, second processing of deleting a pixel along a contour of the human body model in the first image, third processing of adding fluctuation to a pixel value of the first image, fourth processing of adding a figure to the first image, or fifth processing of synthesizing an image of real space with a periphery of the human body model included in the first image; and a trainer using the second image and the teacher image to train a first model.

Feature 2

The training system according to feature 1, wherein the third generator generates the second image by performing, on the first image, at least two selected from the first processing, the second processing, the third processing, the fourth processing, or the fifth processing.

Feature 3

A training system, comprising:

a first generator using a human body model to generate a first image, the human body model modeling a human body and being three-dimensional and virtual, the human body model being partially cut off in the first image;

a second generator generating a teacher image by annotating body parts of the human body model in the first image; and a trainer using the first image and the teacher image to train a first model.

Feature 4

A training system, comprising:

a first generator using a human body model to generate a first image, the human body model modeling a human body and being three-dimensional and virtual;

a second generator generating a teacher image by annotating body parts of the human body model in the first image;

a third generator using the first image to generate a second image including noise; and a trainer using the second image and the teacher image to train a first model including a neural network, the neural network including a first block reducing an input image and outputting a feature map, a first residual block receiving input of the feature map output from the first block, a second residual block receiving input of a feature map output from the first residual block, and outputting a feature map having a same size as the input feature map and the feature map output from the first residual block, a second block receiving input of the feature map output from the first residual block and the feature map output from the second residual block, a third block receiving input of the feature map output from the first block and a feature map output from the second block, and a fourth block enlarging a feature map output from the third block and outputting an output image.

Feature 5

The training system according to any one of features 1 to 4, wherein the first image includes depth information.

Feature 6

A training system, comprising:

a first generator using a human body model to generate a first image, the human body model modeling a human body and being three-dimensional and virtual, the first image including depth information at a plurality of points of the human body model;

a second generator generating a teacher image by calculating three-dimensional centroids of body parts of the human body model and by annotating the centroids of the body parts of the human body model in the first image;

a third generator generating a second image in which noise is added to the first image; and a trainer using the second image and the teacher image to train a first model.

Feature 7

The training system according to any one of features 1 to 6, wherein the first generator:

sets positions of the body parts of the human body model to match position data of positions of body parts of a person in real space; and generates the first image by using the human body model in which the positions of the body parts are set.

Feature 8

The training system according to any one of features 1 to 7, wherein the first image includes the human body model imaged from above.

Feature 9

The training system according to any one of features 1 to 8, wherein the first generator generates the first image by also using an environment model modeling an environment in real space.

Feature 10

An analysis system, comprising:

an acquirer inputting an input image of a first person in real space to the first model trained by the training system according to any one of features 1 to 9 to acquire an output image in which body parts of the first person are annotated; and an estimator estimating, based on the output image, skeleton information of positions of a skeleton of the first person.

Feature 11

The analysis system according to feature 10, further comprising:

a calculator, the acquirer acquiring a plurality of the output images by inputting, to the first model, a plurality of the input images showing a movement of the first person in a first work, the calculator using a plurality of the skeleton information based on the plurality of output images to generate time-series data of a movement of the body parts over time, and calculating a period of a movement of the first person based on the time-series data.

Feature 12

A training method, comprising:

using a human body model to generate a first image, the human body model modeling a human body and being three-dimensional and virtual;

generating a teacher image by annotating body parts of the human body model in the first image;

generating a second image including noise by performing, on the first image, at least one selected from first processing of deleting a pixel along an edge of the first image, second processing of deleting a pixel along a contour of the human body model in the first image, third processing of adding fluctuation to a pixel value of the first image, fourth processing of adding a figure to the first image, or fifth processing of synthesizing an image of real space with a periphery of the human body model included in the first image; and using the second image and the teacher image to train a first model.

Feature 13

A training method, comprising:

using a human body model to generate a first image including depth information at a plurality of points of the human body model, the human body model modeling a human body and being three-dimensional and virtual;

generating a teacher image by calculating three-dimensional centroids of body parts of the human body model and by annotating the centroids of the body parts of the human body model in the first image;

generating a second image by adding noise to the first image; and using the second image and the teacher image to train a first model.

Feature 14

A training method, comprising:

using a human body model to generate a first image, the human body model modeling a human body and being three-dimensional and virtual, the human body model being partially cut off in the first image;

generating a teacher image by annotating body parts of the human body model in the first image; and using the first image and the teacher image to train a first model.

Feature 15

The training method according to any one of features 12 to 14, wherein positions of the body parts of the human body model are set to match position data of positions of body parts of a person in real space, and the first image is generated by using the human body model in which the positions of the body parts are set.

Feature 16

The training method according to any one of features 12 to 15, wherein the first generator generates the first image by also using an environment model modeling an environment in real space.

Feature 17

An analysis method, comprising:

inputting an input image of a first person in real space to the first model trained by the training method according to any one of features 12 to 16 to acquire an output image in which body parts of the first person are annotated; and estimating, based on the output image, skeleton information of positions of a skeleton of the first person.

Feature 18

A program causing a computer to:

use a human body model to generate a first image, the human body model modeling a human body and being three-dimensional and virtual;

generate a teacher image by annotating body parts of the human body model in the first image;

generate a second image including noise by performing, on the first image, at least one selected from first processing of deleting a pixel along an edge of the first image, second processing of deleting a pixel along a contour of the human body model in the first image, third processing of adding fluctuation to a pixel value of the first image, fourth processing of adding a figure to the first image, or fifth processing of synthesizing an image of real space with a periphery of the human body model included in the first image; and use the second image and the teacher image to train a first model.

Feature 19

A program causing a computer to:

use a human body model to generate a first image including depth information at a plurality of points of the human body model, the human body model modeling a human body and being three-dimensional and virtual;

generate a teacher image by calculating three-dimensional centroids of body parts of the human body model and by annotating the centroids of the body parts of the human body model in the first image;

generate a second image by adding noise to the first image; and use the second image and the teacher image to train a first model.

Feature 20

The program according to feature 18 or 19, wherein the computer is caused to:

set positions of the body parts of the human body model to match position data of positions of body parts of a person in real space; and generate the first image by using the human body model in which the positions of the body parts are set.

Feature 21

The program according to any one of features 18 to 20, wherein the computer is caused to also use an environment model modeling an environment to generate the first image.

Feature 22

The program according to any one of features 18 to 21, wherein the computer is caused to:

input an input image of a first person in real space to the trained first model to acquire an output image in which body parts of the first person are annotated; and estimate, based on the output image, skeleton information of positions of a skeleton of the first person.

Feature 23

The program according to feature 22, wherein the computer is caused to:

acquire a plurality of the output images by inputting, to the first model, a plurality of the input images showing a movement of the first person in a first work;

estimate a plurality of the skeleton information from the plurality of output images;

use the plurality of skeleton information to generate time-series data of a movement of the body parts over time; and calculate a period of a movement of the first person based on the time-series data.

Feature 24

A storage medium storing the program according to any one of features 18 to 23.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention. The embodiments described above can be implemented in combination with each other.

What is claimed is:

1. A training system, comprising:

processing circuitry configured to use a human body model to generate a first image, the human body model modeling a human body and being three-dimensional and virtual;

generate a teacher image by annotating body parts of the human body model in the first image;

use the first image to generate a second image including noise; and use the second image and the teacher image to train a first model including a neural network, the neural network including a first block reducing an input image and outputting a feature map, a first residual block receiving input of the feature map output from the first block, a second residual block receiving input of a feature map output from the first residual block, and outputting a feature map having a same size as the input feature map and the feature map output from the first residual block, a second block receiving input of the feature map output from the first residual block and the feature map output from the second residual block, a third block receiving input of the feature map output from the first block and a feature map output from the second block, and a fourth block enlarging a feature map output from the third block and outputting an output image.

2. The training system according to claim 1, wherein the first image includes depth information.

3. The training system according to claim 1, wherein the processing circuitry:

sets positions of the body parts of the human body model to match position data of positions of body parts of a person in real space; and generates the first image by using the human body model in which the positions of the body parts are set.

4. The training system according to claim 1, wherein the first image includes the human body model imaged from above.

5. The training system according to claim 1, wherein the processing circuitry generates the first image by also using an environment model modeling an environment in real space.

6. An analysis system, comprising processing circuitry that performs inputting the input image of a first person in real space to the first model trained by the training system according to claim 1 to acquire the output image in which body parts of the first person are annotated.

7. The analysis system according to claim 6, the processing circuitry acquiring a plurality of the output images by inputting, to the first model, a plurality of the input images showing a movement of the first person in a first work, and using a plurality of skeleton information based on the plurality of output images to generate time-series data of a movement of the body parts over time, and calculating a period of a movement of the first person based on the time-series data.

8. A training method, comprising:

using a human body model to generate a first image, the human body model modeling a human body and being three-dimensional and virtual;

generating a teacher image by annotating body parts of the human body model in the first image;

using the first image to generate a second image including noise; and using the second image and the teacher image to train a first model including a neural network, the neural network including a first block reducing an input image and outputting a feature map, a first residual block receiving input of the feature map output from the first block, a second residual block receiving input of a feature map output from the first residual block, and outputting a feature map having a same size as the input feature map and the feature map output from the first residual block, a second block receiving input of the feature map output from the first residual block and the feature map output from the second residual block, a third block receiving input of the feature map output from the first block and a feature map output from the second block, and a fourth block enlarging a feature map output from the third block and outputting an output image.

9. The training method according to claim 8, wherein the first image includes depth information.

10. The training method according to claim 8, wherein in generating the teacher image,
 positions of the body parts of the human body model are set to match position data of positions of body parts of a person in real space; and
 the first image is generated by using the human body model in which the positions of the body parts are set.

11. The training method according to claim 8, wherein the first image includes the human body model imaged from above.

12. The training method according to claim 8, wherein the first image is generated by also using an environment model modeling an environment in real space.

13. An analysis method, comprising inputting the input image of a first person in real space to the first model trained by the training method according to claim 8 to acquire the output image in which body parts of the first person are annotated.

14. The analysis method according to claim 13, further comprising:
 acquiring a plurality of the output images by inputting, to the first model, a plurality of the input images showing a movement of the first person in a first work;
 using a plurality of skeleton information based on the plurality of output images to generate time-series data of a movement of the body parts over time; and
 calculating a period of a movement of the first person based on the time-series data.

15. A non-transitory computer-readable storage medium storing a program, the program causing a computer to perform:
 using a human body model to generate a first image, the human body model modeling a human body and being three-dimensional and virtual;
 generating a teacher image by annotating body parts of the human body model in the first image;
  using the first image to generate a second image including noise; and
  using the second image and the teacher image to train a first model including a neural network,
 the neural network including
  a first block reducing an input image and outputting a feature map,
  a first residual block receiving input of the feature map output from the first block,
  a second residual block receiving input of a feature map output from the first residual block, and outputting a feature map having a same size as the input feature map and the feature map output from the first residual block,
  a second block receiving input of the feature map output from the first residual block and the feature map output from the second residual block,
  a third block receiving input of the feature map output from the first block and a feature map output from the second block, and
  a fourth block enlarging a feature map output from the third block and outputting an output image.

16. The non-transitory computer-readable storage medium according to claim 15, wherein the first image includes depth information.

17. The non-transitory computer-readable storage medium according to claim 15, wherein
 in generating the teacher image, the program causes the computer to perform,
  setting positions of the body parts of the human body model to match position data of positions of body parts of a person in real space, and
  generating the first image by using the human body model in which the positions of the body parts are set.

18. The non-transitory computer-readable storage medium according to claim 15, wherein the first image includes the human body model imaged from above.

19. The non-transitory computer-readable storage medium according to claim 15, wherein the first image is generated by also using an environment model modeling an environment in real space.

20. The non-transitory computer-readable storage medium according to claim 15, wherein
 the program further causes the computer to perform
  inputting the input image of a first person in real space to the trained first model to acquire the output image in which body parts of the first person are annotated,
  acquiring a plurality of the output images by inputting, to the first model, a plurality of the input images showing a movement of the first person in a first work,
  using a plurality of skeleton information based on the plurality of output images to generate time-series data of a movement of the body parts over time, and
  calculating a period of a movement of the first person based on the time-series data.

* * * * *